US010710309B2

(12) United States Patent
Caldwell et al.

(10) Patent No.: US 10,710,309 B2
(45) Date of Patent: Jul. 14, 2020

(54) SONIC LABEL WELDING UNIT AND METHOD OF MANUFACTURING A MULTI-LAYERED CARE LABEL

(71) Applicant: Avery Dennison Retail Information Services, LLC, Mentor, OH (US)

(72) Inventors: Christopher Caldwell, Lenoir, NC (US); Paul Chamandy, Skaneateles, NY (US); Derrick Harrison, Lenoir, NC (US)

(73) Assignee: AVERY DENNISON RETAIL INFORMATION SERVICES, LLC, Mentor, OH (US)

(*) Notice: Subject to any disclaimer, the term of this patent is extended or adjusted under 35 U.S.C. 154(b) by 303 days.

(21) Appl. No.: 15/492,370

(22) Filed: Apr. 20, 2017

(65) Prior Publication Data

US 2017/0305068 A1     Oct. 26, 2017

Related U.S. Application Data

(60) Provisional application No. 62/325,062, filed on Apr. 20, 2016.

(51) Int. Cl.
  *B32B 37/00* (2006.01)
  *B29C 65/08* (2006.01)
  (Continued)

(52) U.S. Cl.
  CPC .......... *B29C 65/08* (2013.01); *B29C 65/7451* (2013.01); *B29C 65/76* (2013.01);
  (Continued)

(58) Field of Classification Search
  USPC ...................................... 156/580.1
  See application file for complete search history.

(56) References Cited

U.S. PATENT DOCUMENTS

| 2,752,703 A | 7/1956 | Halperin |
| 3,647,599 A | 3/1972 | Garnder |

(Continued)

FOREIGN PATENT DOCUMENTS

| EP | 0032703 | 7/1981 |
| EP | 0043044 | 1/1982 |

(Continued)

OTHER PUBLICATIONS

International Search Report and Written Opinion of ISA/EPO prepared for PCT/US17/28557 dated Jul. 21, 2017.

*Primary Examiner* — James D Sells
(74) *Attorney, Agent, or Firm* — Avery Dennison Retail Information Services, LLC

(57) ABSTRACT

A sonic label welding device for welding multiple labels together using ultrasonic welding is disclosed. The sonic label welding device comprises a digital controls main menu screen which includes touch screen buttons that are utilized to go to specific screens to program the device to perform in a certain manner. For example, a user can press the cut to length button if wanting to cut a label to a specific length, or the label weld count button to specify the number of labels being sonically welded. Further, the sonic label welding device comprises a head for allowing multiple labels to be assembled under pressure and an anvil for directing the high frequency vibrations. A method of manufacturing a multi-layer care label is also disclosed.

16 Claims, 28 Drawing Sheets

(51) Int. Cl.

| | |
|---|---|
| *B29C 65/00* | (2006.01) |
| *B29C 65/76* | (2006.01) |
| *B29C 65/74* | (2006.01) |
| *B29C 69/00* | (2006.01) |
| *B29C 65/56* | (2006.01) |
| *B29L 31/48* | (2006.01) |
| *B29C 65/72* | (2006.01) |
| *B29C 65/62* | (2006.01) |
| *B29L 31/00* | (2006.01) |

(52) U.S. Cl.
CPC .... *B29C 66/1122* (2013.01); *B29C 66/30621* (2013.01); *B29C 66/43* (2013.01); *B29C 66/45* (2013.01); *B29C 66/729* (2013.01); *B29C 66/73921* (2013.01); *B29C 66/8161* (2013.01); *B29C 66/81433* (2013.01); *B29C 66/8242* (2013.01); *B29C 66/8322* (2013.01); *B29C 66/9221* (2013.01); *B29C 66/9241* (2013.01); *B29C 66/934* (2013.01); *B29C 66/944* (2013.01); *B29C 66/9672* (2013.01); *B29C 66/9674* (2013.01); *B29C 66/98* (2013.01); *B29C 69/001* (2013.01); *B29C 65/562* (2013.01); *B29C 65/62* (2013.01); *B29C 65/72* (2013.01); *B29C 66/306* (2013.01); *B29C 66/71* (2013.01); *B29C 66/7294* (2013.01); *B29C 66/872* (2013.01); *B29C 66/929* (2013.01); *B29C 2793/0081* (2013.01); *B29C 2795/002* (2013.01); *B29L 2031/48* (2013.01); *B29L 2031/744* (2013.01)

(56) References Cited

U.S. PATENT DOCUMENTS

| | | | |
|---|---|---|---|
| 3,813,021 | A | 5/1974 | Kramer |
| 4,313,778 | A | 2/1982 | Mims |
| 4,500,372 | A | 2/1985 | Mion |
| 6,309,490 | B1 | 10/2001 | Davis et al. |
| 7,681,378 | B2 | 3/2010 | Brormann et al. |
| 8,096,339 | B2 | 1/2012 | Aust |
| 2002/0176730 | A1 | 11/2002 | Bleckmann et al. |
| 2002/0183183 | A1 | 12/2002 | Turvey |
| 2008/0263919 | A1 | 10/2008 | Halliday |
| 2011/0108184 | A1 | 5/2011 | Cai et al. |
| 2013/0122235 | A1 | 5/2013 | Moliski et al. |
| 2015/0336272 | A1* | 11/2015 | Drew .............. B25J 9/1687 156/64 |

FOREIGN PATENT DOCUMENTS

| | | |
|---|---|---|
| EP | 0081690 | 6/1983 |
| EP | 0786323 | 7/1997 |
| FR | 22057652 | 5/1974 |
| JP | 2008156424 | 7/2008 |
| JP | 3175127 | 4/2012 |

\* cited by examiner

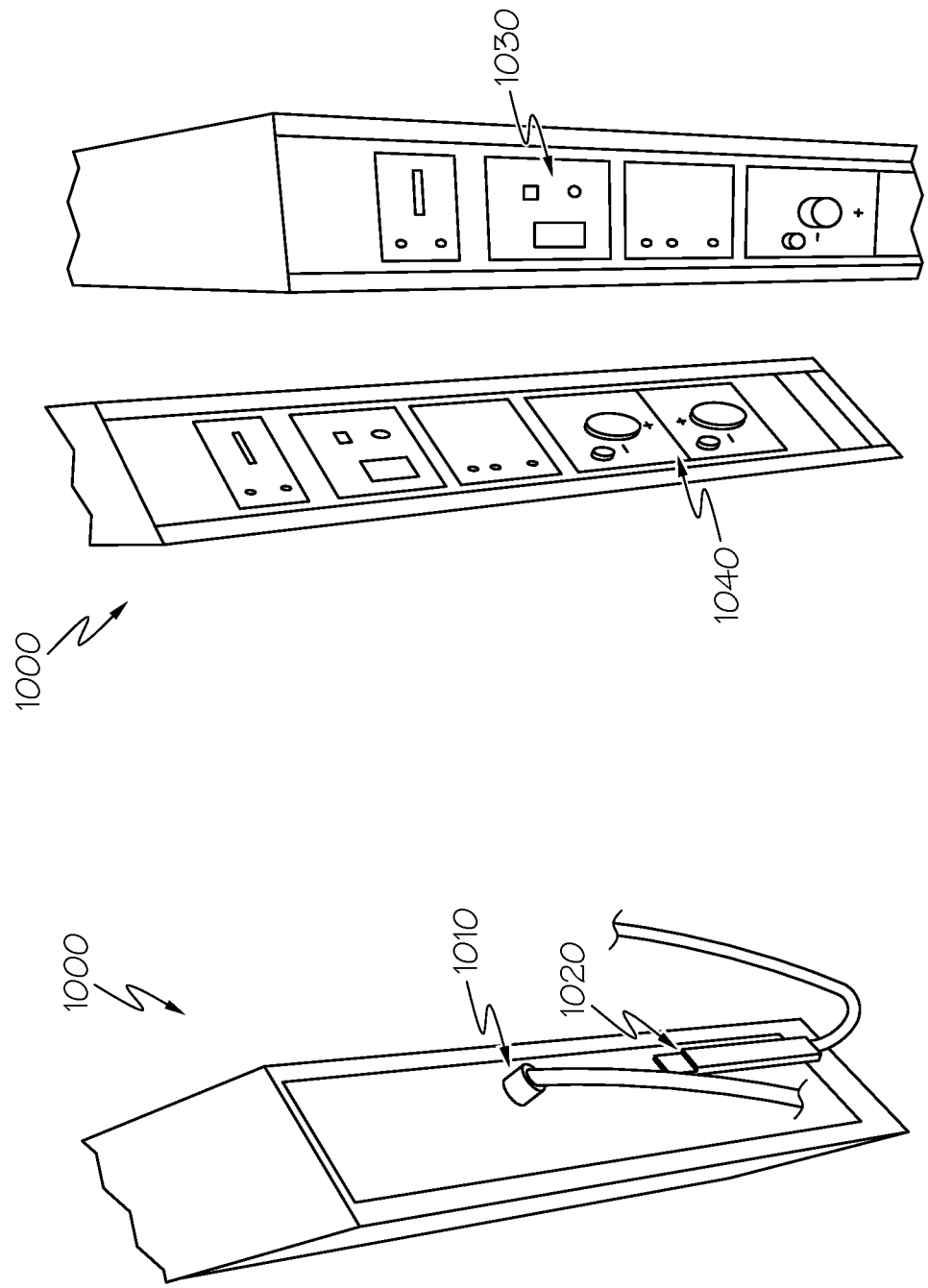

SONIC LABEL WELDING UNIT AND METHOD OF MANUFACTURING A MULTI-LAYERED CARE LABEL

CROSS-REFERENCE

This application claims priority from and the benefit of Provisional Patent Application Ser. No. 62/325,062 filed on Apr. 20, 2016, which is incorporated by reference in its entirety.

BACKGROUND

Product and other compliance labels play an important role in educating a user, such as a consumer, about a particular product and are well known in the art. Oftentimes it is necessary to attach multiple labels to a product, or include multiple labels within the product packaging. For example, sewing contractors, sewing operators, and other users typically sew multiple labels and other articles simultaneously into a garment so that the necessary labels are provided with a garment when sold to a consumer. However, it is difficult to keep the multiple labels or other articles aligned, which results in a decrease to their production capabilities, as the sewing operator has to align the individual units prior to affixing the labels to the garment. Additionally, multiple labels are difficult to handle at one time resulting in continuous adjustment and rearrangement of the position and alignment of the labels, and a decrease in sewing speed. It has been desired that if the labels are initially aligned and bonded together, it would allow more room to print language translations, care instructions, material content, etc. Therefore, there is a continuing need for a device that can align and bond together multiple labels for the ease of placement in a garment during the sew-in process.

The present invention discloses a sonic label welding unit that welds multiple labels together into one packet or stack with the individual labels aligned in the stack prior to bonding. The labels in the packet will be aligned and will be easier to handle for the sewing contractor or operator, and will increase sewing speed as well as the speed of garment production in the factory. The weld will hold the multiple labels together, 2 or more and preferably 4 or more, and keep the labels aligned during the sewing operation. The weld can be adjusted for strength such that the top and bottom label can be torn off without destroying the other labels. Thus, the welding unit will allow users to install a label packet into a garment without having to continuously adjust and rearrange the position and alignment of the labels.

The present invention further discloses a method for manufacturing a multi-layered care label utilizing the sonic label welding unit described herein.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a sonic welding unit for welding multiple labels or other articles together using ultrasonic welding. The device may use a sonic horn or cold knife in connection with the provision of ultrasonic energy, especially when cutting coated materials. The device may also use a sonic or hot knife, especially when cutting uncoated materials. The sonic welding unit includes a digital controls main menu screen which has touch screen buttons that are utilized to go to specific screens. Specifically, a user can press the registration button if using a registration mark on the product, the user can press the cut to length button if wanting to cut to a specific length, the user can press the printer screen button to use this screen while running product, and the user can press the timer button and enter a code to use manual functions, override the automatic features. The main menu screen also comprises, but is not limited to, controls such as start cycle, stop cycle, move registration number to the right or left by one index, or escape (go back a screen).

In a preferred embodiment, the sonic welding device comprises an anvil and a textured or knurled head. The anvil is where the labels or other articles are placed on the welding device and allows the high frequency vibration from the welding device to be directed to the proper interfaces of the labels or other articles. The head allows the multiple labels or other articles to be assembled under pressure. Additionally, the label welding device comprises a converter, a cold knife, sonic horn or sonotrode and a power supply to seal the multiple labels together via ultrasonic welding. The power supply delivers a high power AC signal with frequency matching the resonance frequency of the converter and sonic horn or cold knife. The converter converts the electrical signal into a mechanical vibration, and the sonic horn or cold knife applies the mechanical vibration to the labels to be welded.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 10A and FIG. 10B illustrate a perspective view of the ultrasonic units of the sonic label welding device in accordance with the disclosed architecture;

DETAILED DESCRIPTION OF THE INVENTION

Figure 1:
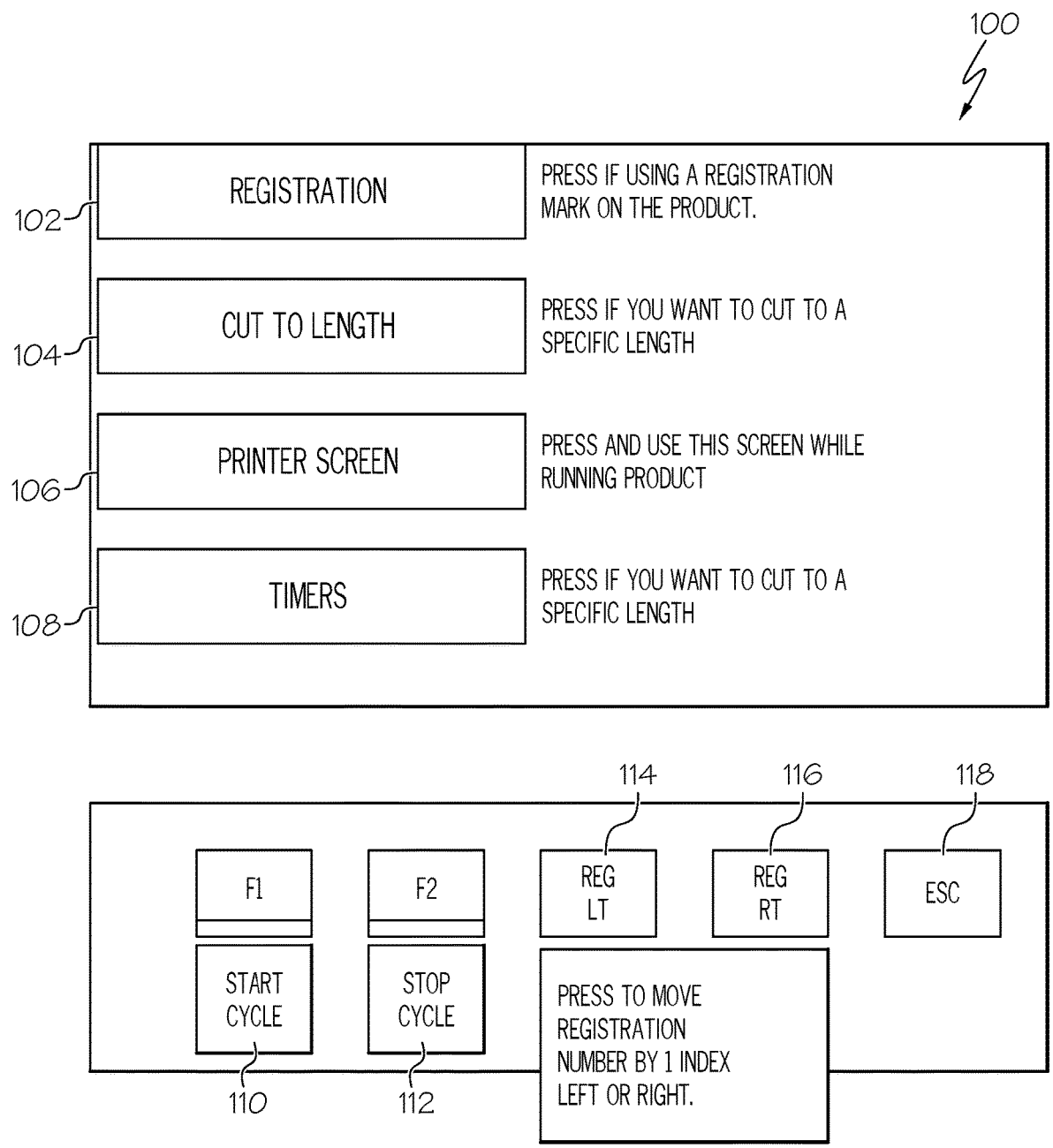
FIG. 1 illustrates a perspective view of a main menu touch screen for the sonic label welding device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a sonic label welding device that welds multiple labels together into one packet or stack and a method for manufacturing a multi-layer care label using said sonic label welding device. The weld will hold the multiple labels together and keep the labels aligned during the sewing operation. The weld can be adjusted for strength such that the top and bottom label can be torn off without destroying the other labels. Once the weld function is complete, the labels will be joined perfectly straight and aligned in a single packet, ready for the sew-in process.

Referring initially to FIG. 1, the sonic label welding unit comprises a digital controls main menu screen 100 which includes touch screen buttons that are utilized to go to specific screens. For example, a user can press the registration button 102 if using a registration mark on the product, the user can press the cut to length button 104 if wanting to cut to the label panels to a specific length, the user can press the printer screen button 106 to use this screen while running product, and the user can press the timers button 108 and enter a code to use manual functions. Main menu screen 100 also comprises, but is not limited to, controls such as a start cycle 110, a stop cycle 112, a move registration number to the left 114 or right 116 by one index, or escape 118 (to go back a screen).

Figure 2:
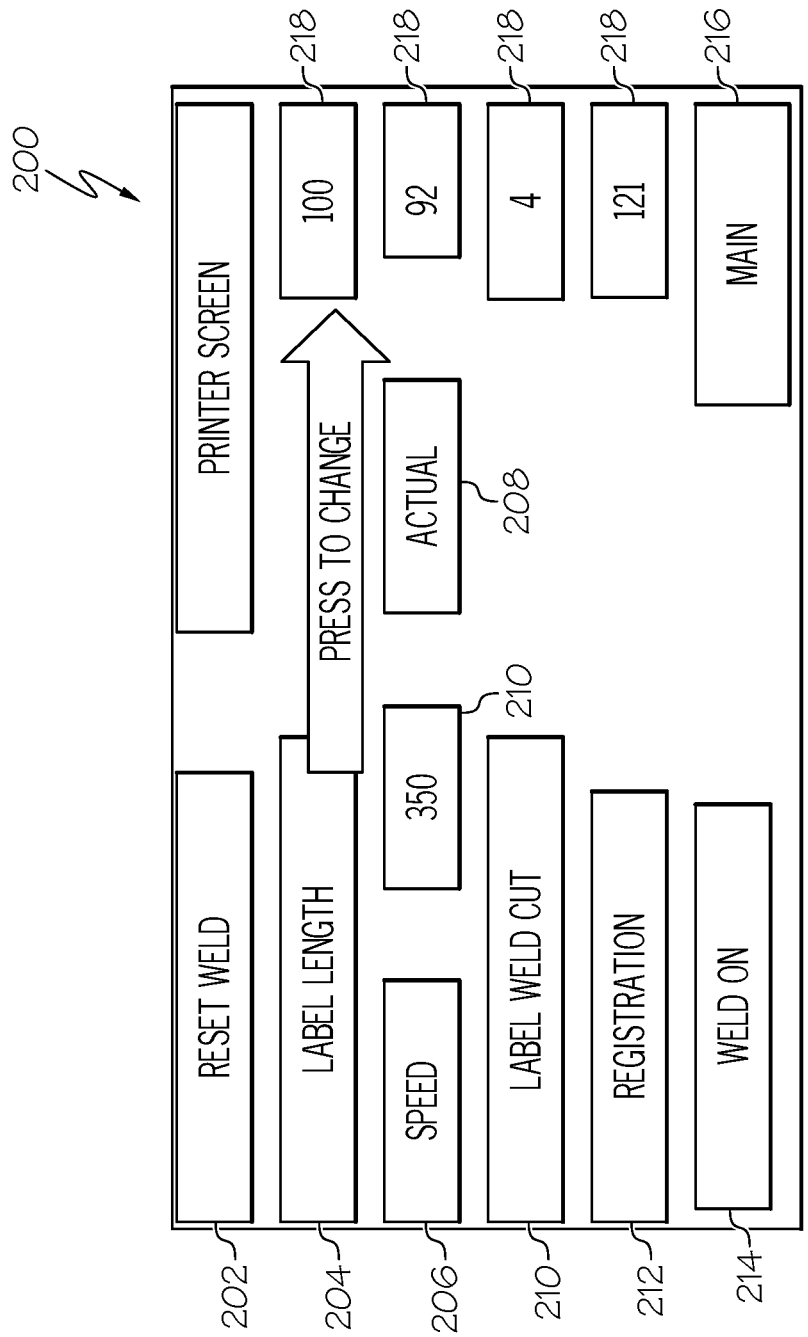
FIG. 2 illustrates a perspective view of a printer screen touch screen for the sonic label welding device in accordance with the disclosed architecture.

As shown in FIG. 2, when printer screen button 106 is pressed, the printer screen 200 is activated which is typically used during normal runs. Printer screen 200 has multiple controls for controlling the run cycle of the welding unit. For example, but not limited to, a 'reset weld' button 202 which resets the weld count, a 'label length' button 204 which cuts the label to a desired length, a 'speed' button 206 which runs the cycle at a desired speed wherein the higher the number the faster the machine cycles, an 'actual' button 208 refers to the actual cycle speed, a 'label weld count' button 210 refers to the amount of labels that will be welded together, a 'registration' button 212 refers to the registration length, a 'weld on' button 214 that may be one color (e.g., red) when the unit is welding the labels together and a different color (e.g., blue) when the welding unit is shut off, a 'main' button 216 that sends the user back to main menu screen 100, and a plurality of buttons 218 that are used to change the values associated with the various buttons described above.

Figure 3:
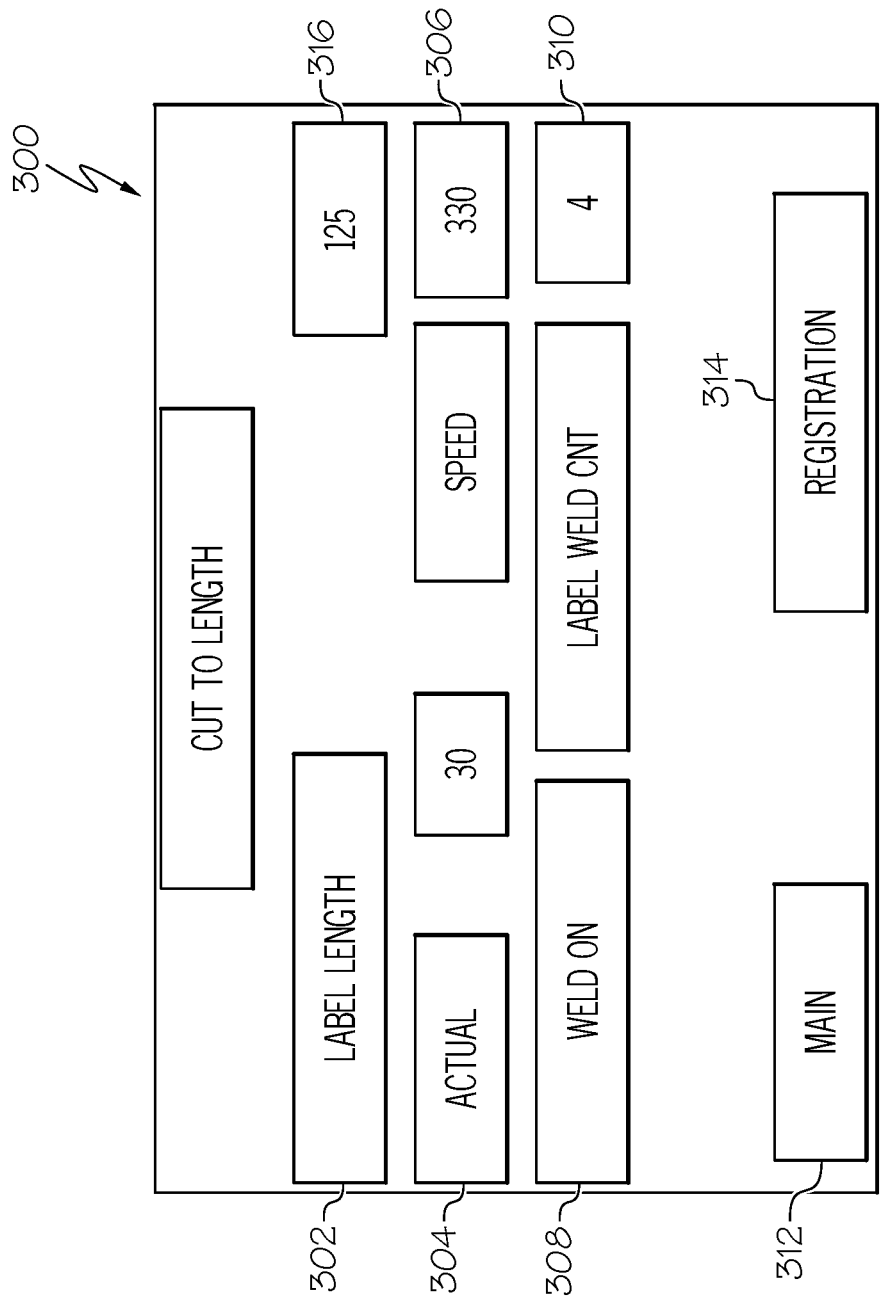
FIG. 3 illustrates a perspective view of a cut to length screen touch screen for the sonic label welding device in accordance with the disclosed architecture.

As shown in FIG. 3, when the cut to length button 104 is pressed by the user, the cut to length screen 300 is activated which is used during set up when running a product to a desired length. The cut to length screen 300 has multiple controls for controlling the desired length of a product label. For example, but not limited to, the 'cut to length' button refers to the current screen, a 'label length' button 302 refers to the desired length of the label (i.e., cut to a certain length), an 'actual' button 304 refers to the actual cycle speed, a 'speed' button 306 refers to the desired speed where the higher the number, the faster the unit cycles, a 'weld on' button 308 that may be one color (e.g., red) when the unit is welding the labels together and a different color (e.g., blue) when the welding unit is shut off, a 'label weld count' button 310 that refers to the amount of labels that will be welded together, a 'main' button 312 that sends the user back to main menu screen 100, a "registration" button 314 that send the user to a registration screen 400, and a plurality of buttons 316 that are used to change the values associated with the various buttons described above.

Figure 4:
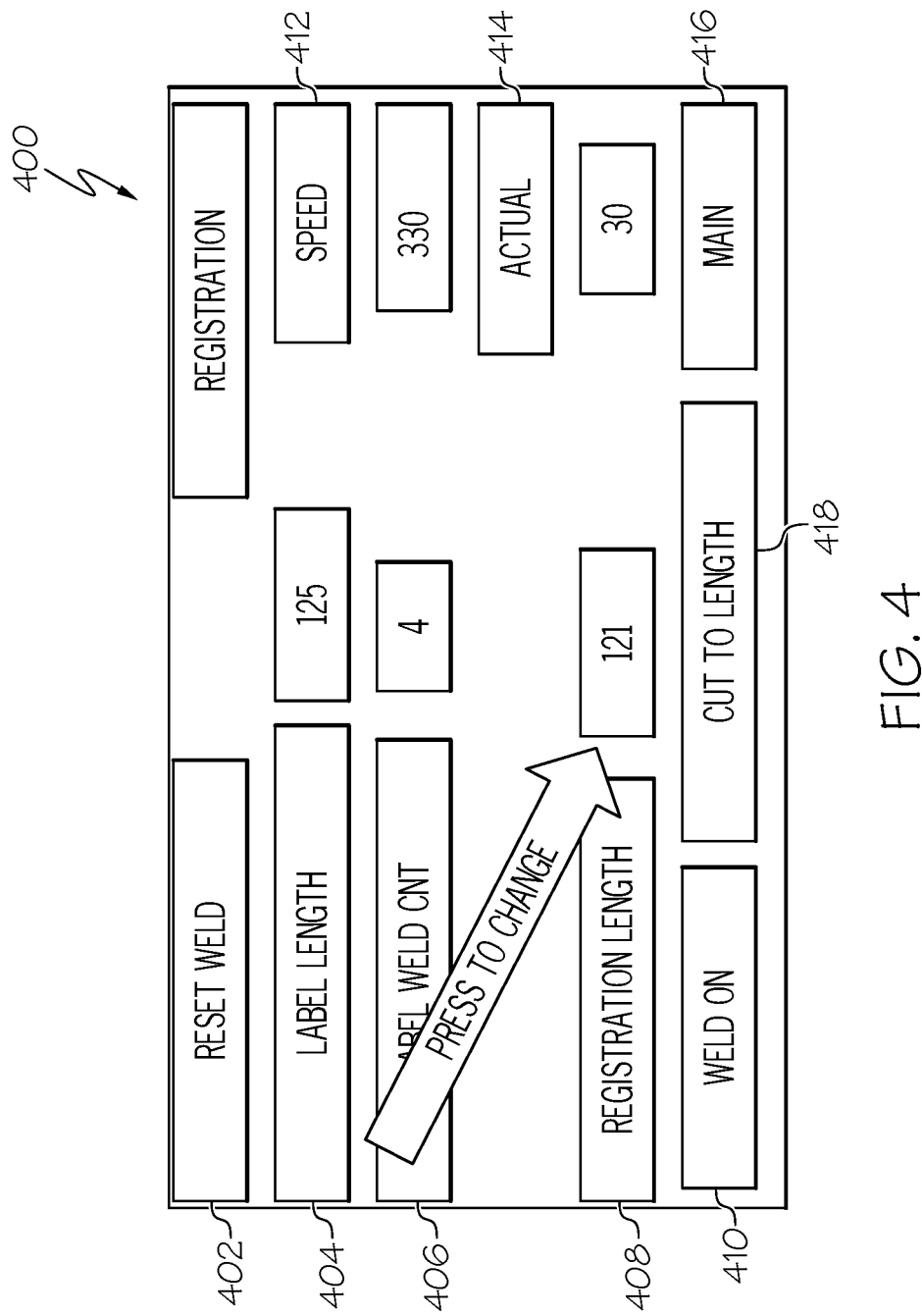
FIG. 4 illustrates a perspective view of a registration screen touch screen for the sonic label welding device in accordance with the disclosed architecture.

As shown in FIG. 4, when registration buttons 102 or 314 is pressed by the user, registration screen 400 is activated which is used during set up of the product. Registration screen 400 has multiple controls for using a registration mark on the product. For example, but not limited to, a 'reset weld' button 402 which resets the weld count, a 'registration' button which refers to the current screen, a 'label length' button 404 refers to the desired length of a label (i.e., cut to length), a 'label weld count' button 406 refers to the amount of labels welded together or cycles before the welding unit welds the labels together, a 'registration length' button 408 refers to the size of the label including the registration mark on a side of the label roll, a 'weld on' button 410 that may be one color (e.g., red) when the unit is welding the labels together and a different color (e.g., blue) when the welding unit is shut off, a 'speed' button 412 allows a user to control how fast the unit is feeding with the higher the number the faster the unit will feed, an 'actual' button 414 refers to the actual speed of the labels being cut, a 'main' button 416 send the user back to main menu screen 100, a 'cut to length' button 418 send the user to cut to length screen 300, and a plurality of buttons 420 that are used to change the values associated with the various buttons described above.

Figure 5A:
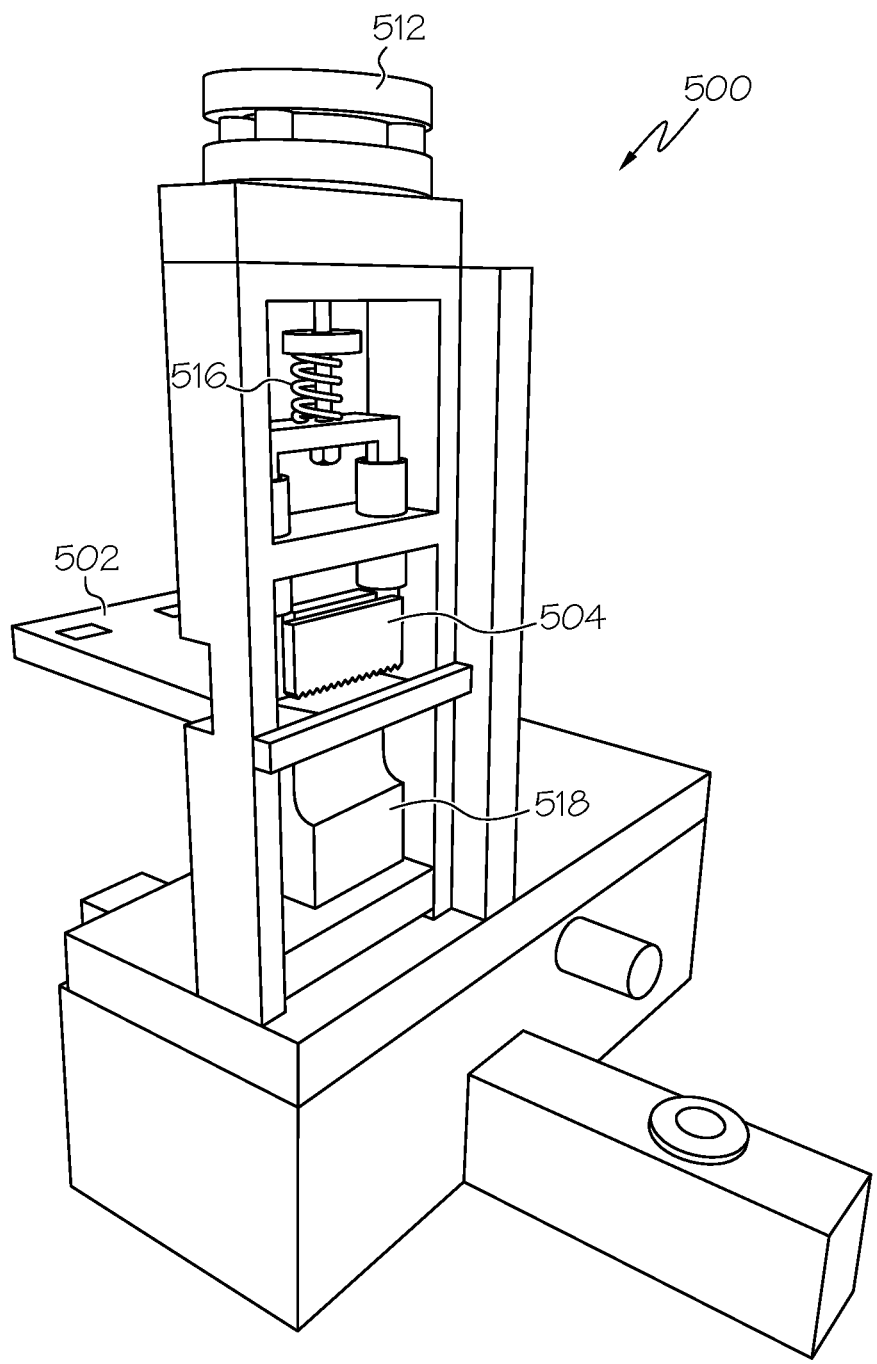
FIG. 5A illustrates a perspective view of a manual sonic welding device in accordance with the disclosed architecture.

FIG. 5A illustrates one embodiment of a sonic label welding device 500 for welding multiple labels or other articles together using ultrasonic welding. The sonic label welding device 500 comprises an anvil 502 and a head or press 504. The anvil 502 is where the labels or other articles are placed on the welding device 500 and allows the high frequency vibration from the welding device 500 to be directed to the proper interfaces of the labels or other articles being joined.

The head or press 504 of sonic welding device 500 allows the multiple labels or other articles to be assembled under pressure. Typically, the surface of head 504 is knurled or textured which influences the strength of the weld and helps to secure the labels or other articles in place on anvil 502. Furthermore, pressure of the head 504 can be controlled pneumatically. For example, a user can utilize an air cylinder 512 which will drive the head 504 downward against the labels. Typically, the air cylinder 512 is controlled by a solenoid valve (not shown) or any other suitable device as is known in the art. The welding device 500 has an input voltage to the solenoid valve of approximately between 100 to 120 Volts. The user can adjust the air pressure of the air cylinder 512 via an air pressure gauge (not shown) and other controls as is known in the art. Users can also adjust the pressure of the head 504 via manually adjusting a nut pressure control 516, which influences the strength of the weld. Typically, the welding device 500 utilizes approximately 60 to 100 psi (pounds per square inch) input air pressure for air cylinder operation. Notwithstanding, it is contemplated that other known systems, such as hydraulic pressure systems, could also be used without affecting the overall concept of the present invention. Further detail on welding device 500 and its operation is included in U.S. Published Patent Application US2013/0122235 owned by Avery Dennison Corporation, which is hereby incorporated herein by reference.

Figure 5B:
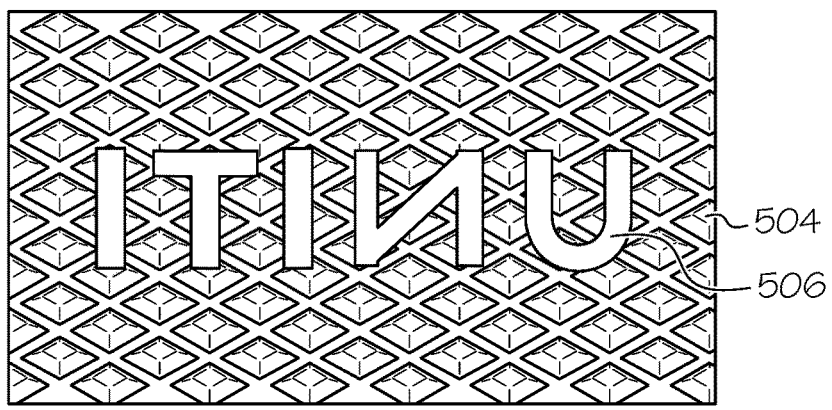
FIG. 5B illustrates a elevational view of the knurled or textured head of a sonic welding device with a trademark image thereon in accordance with the disclosed architecture.
Figure 5C:
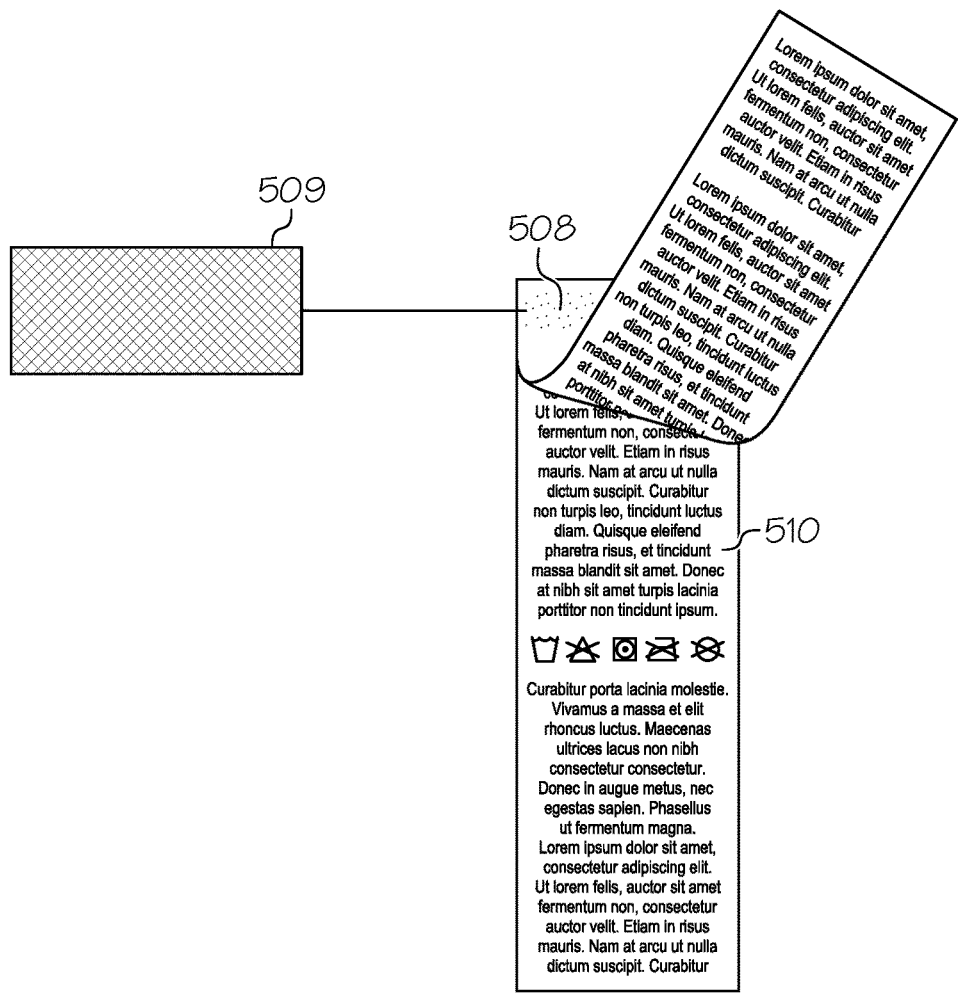
FIG. 5C illustrates a perspective view of the image of the knurled or textured head of a sonic welding device with a trademark image thereon onto a multi-layer care label.

FIG. 5B illustrates a elevational view of the knurled or textured surface of head or press 504 of a sonic welding device with a trademark image 506 thereon in accordance with the disclosed architecture. Utilizing a trademark image on a label or any other sort of consumable good that can be utilized with the present invention, allows for indication of a supplier or source of the good. FIG. 5C illustrates a perspective view of the image 508 on a multi-layer care label 510 by the knurled or textured head or press 509 of a sonic welding device.

Figure 6:
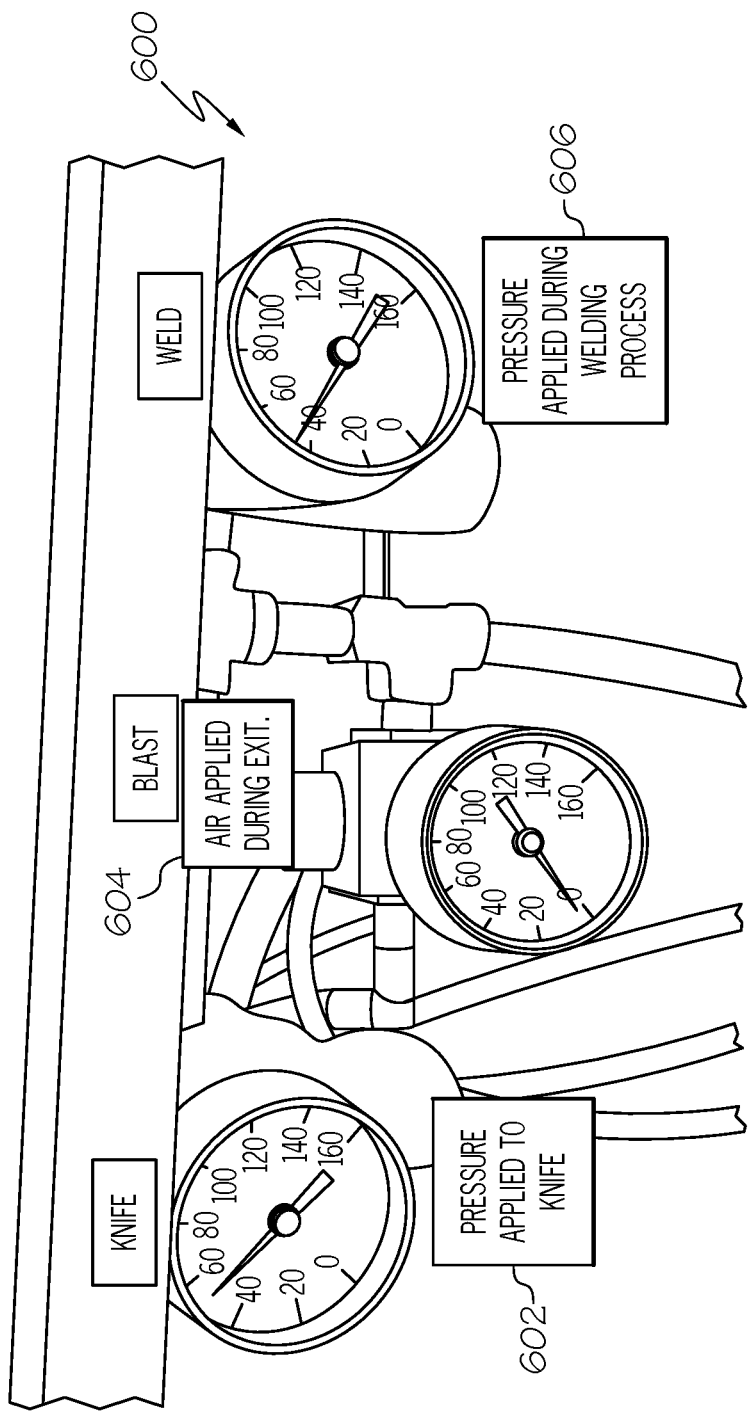
FIG. 6 illustrates a perspective view of the pressure settings of the sonic label welding device in accordance with the disclosed architecture.

Additionally, as shown in FIG. 6, when utilizing the welding unit to cut or weld a label, a user must adjust the pressure settings 600, i.e., pressure applied to the knife 602, air applied during exit 604, and pressure applied during the welding process 606. Further, there are four components that can affect the cut or weld. More specifically: (i) the pressure setting controls the amount of pressure applied during the cutting or welding process; (ii) the depth setting controls how deep the head penetrates the material; (iii) the heat or energy setting controls how much heat or energy is applied (ultra-sonic supplies heat through vibration); and (iv) the time setting controls the amount of time the heat and pressure are applied to the material. Thus, the more depth, pressure, and time utilized can cut or weld a product quickly; however they can also damage components if applied improperly or varied without consideration of the other settings on the machine.

For example, with respect to woven satin care labels, it has been found that between 1.5 and 6 pounds of sonic weld force will result in a suitable weld that does not irritate the skin of the individual wearing a garment with the label attached thereto, and is soft enough to be easily penetrated by a sewing needle or plastic staple that is used to attached the care label to the garment. Similarly, with respect to coated tape care labels, it has been found that between 0.2 and 3 pounds of sonic weld force will result in a suitable weld that does not irritate the skin of the individual wearing a garment with the label attached thereto, and is soft enough to be easily penetrated by a sewing needle or plastic staple that is used to attached the care label to the garment. Nonetheless, a user should regulate each setting carefully, applying only a little pressure until a good weld or cut is achieved and then stopping and remembering the setting, as less pressure has been found to be typically better, typically when welding light weight fabric materials such as those used for multi-layered care labels.

Figure 7B:
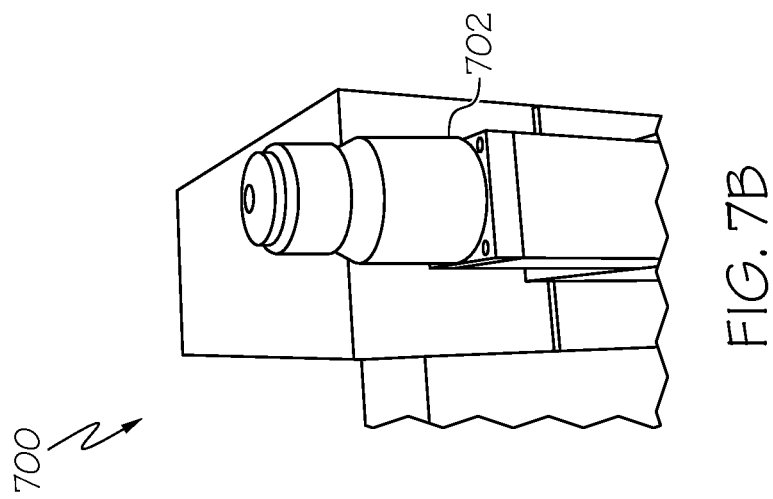
FIG. 7A and FIG. 7B illustrate a perspective view of the cutting knife of the sonic label welding device in accordance with the disclosed architecture.
Figure 7A:
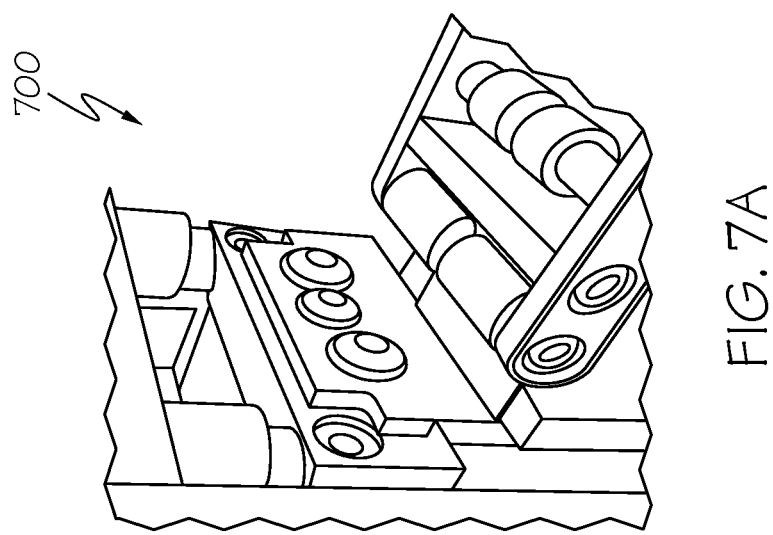

As shown in FIGS. 7A and 7B, the sonic label welding unit also comprises a cutting knife or cold knife 700 with a guard, a stop adjustment, and an upper stroke limit. Cutting knife 700 is positioned after the nip roller and cycles down under air pressure. When cutting knife 700 reaches the bottom of its stroke, the ultrasonic horn (not shown) below the knife turns on and vibrates and generates the heat required to cut the label. A cold knife can be used with coated materials, for example with care labels, since the label may be next to the skin of a wearer, the coating can be applied to make the label smooth so it does not irritate the wearer of the garment. However, a hot or sonic knife can be used with uncoated materials without affecting the overall scope of the invention. To adjust the depth of the knife stroke, a user can loosen the set screw on the stop adjustment 702. More specifically, to increase the depth of the knife stroke, the user loosens or turns the stop adjustment 702 up; and to decrease the depth of the knife stroke, the user lowers or tightens the stop adjustment 702. Thus, moving the stop adjustment 702 up means a deeper cut and lowering the stop adjustment will make a shallower cut.

Figure 8:
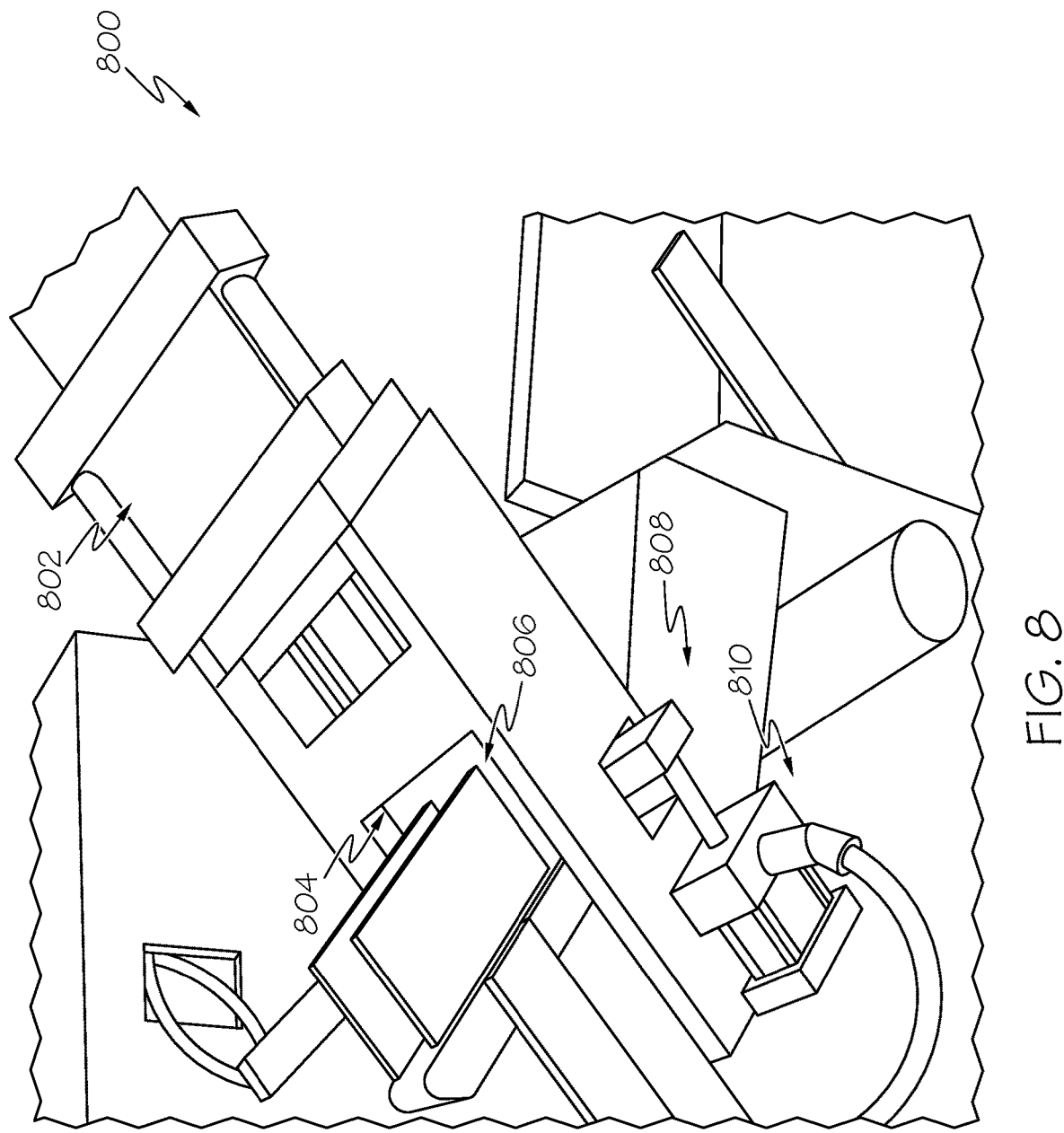
FIG. 8 illustrates a perspective view of the welding station of the sonic label welding device in accordance with the disclosed architecture.

Additionally, as shown in FIG. 8, the welding station 800 comprises a welding cylinder 802, a welding bar 804, a hopper 806, a gate 808, and a gate cylinder 810. In the welding station 800, four pieces of label material (not shown) get staged in hopper 806. Once the count is complete, welding bar 804 presses down on the label materials. Next, the ultrasonic unit (not shown) turns on and welds the four pieces of label material together. The gate 808 then lowers and allows the stack of label materials to move to the outfeed conveyor (not shown). Then, gate 808 raises and starts the cycle again.

Figure 9:
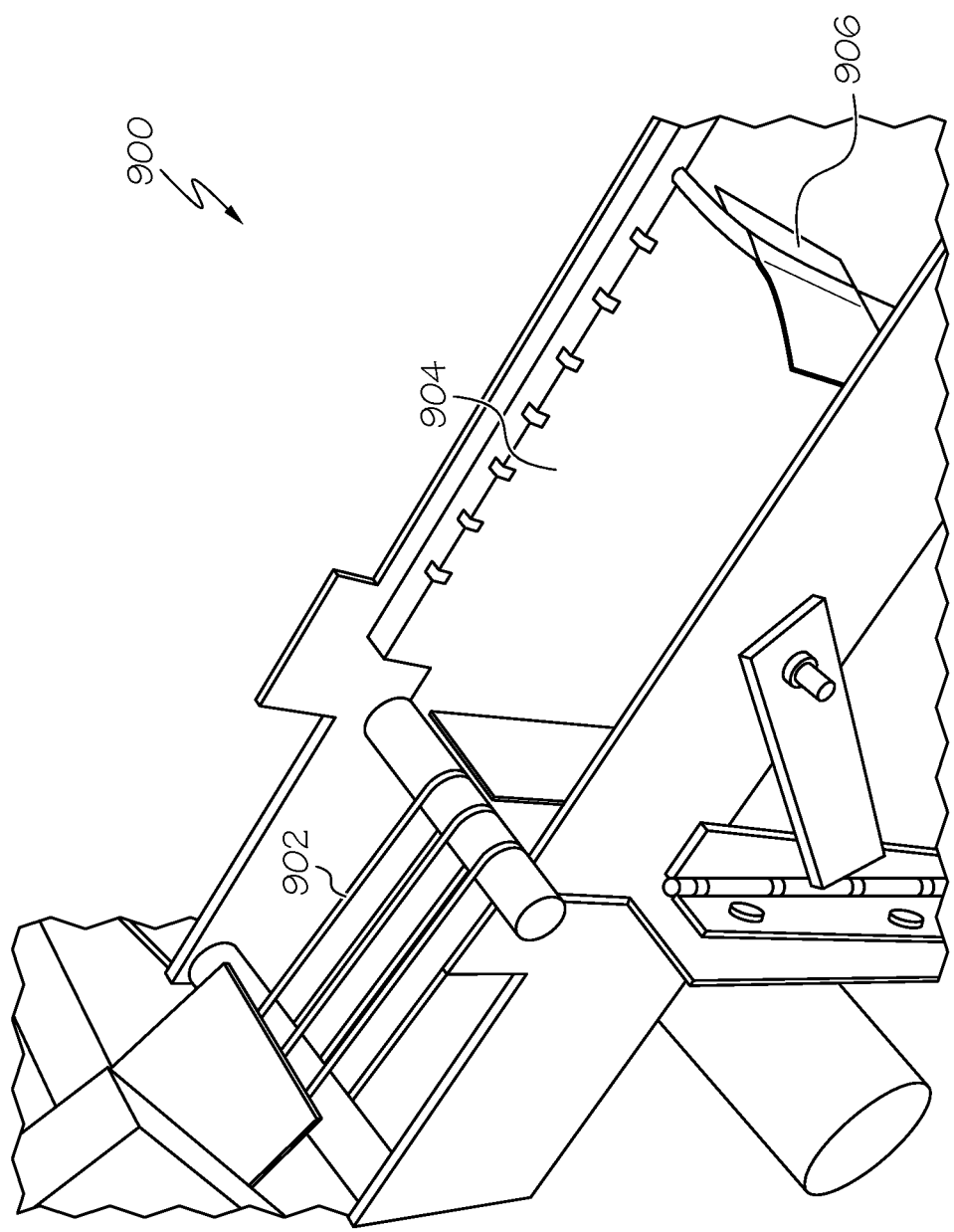
FIG. 9 illustrates a perspective view of the outfeed conveyor and hopper of the sonic label welding device in accordance with the disclosed architecture.

As shown in FIG. 9, an outfeed conveyor and hopper 900 comprise an exit conveyor 902, an outfeed hopper 904, and a back guide 906. The stack of four labels are transported to the hopper by this conveyor. While the number of labels used in the present invention has been suggested to be four labels, it should be understood that more than four labels can be welded together and, likewise, fewer than four labels can be welded together without affecting the overall scope of the invention. Increasing or decreasing the number of labels to be secured or welded together will normally require an increase or decrease in the amount of pressure applied to the label stack, and adjustment of the other elements of the welding unit. Also, different types of materials may require different settings if, for example, the same number of labels are being secured in a set.

Furthermore, as shown in FIG. 5A, the sonic welding device 500 also includes a converter (not shown), a sonic horn or sonotrode 518 and a power supply to seal the multiple labels together via ultrasonic welding. The converter and the sonic horn 518 are specifically tuned to resonate at the same ultrasonic frequency, such as approximately 20, 30, 35 or 40 kHz (kilohertz). The power supply or electronic ultrasonic generator delivers a high power AC signal with frequency matching the resonance frequency of the converter and sonic horn 518. The converter converts the electrical signal into a mechanical vibration.

The sonic horn 518 applies the high-frequency, mechanical vibrations to the labels to be welded. The sonic horn 518 operates perpendicular to the labels and fuses the labels together in the pattern of the stationary anvil 502. Specifically, welding occurs as the result of heat generated at the interface between the surfaces of the labels. The ultrasonic energy melts the point of contact between the labels, which creates a bond or weld when cool. Welding times can vary, but typically the welds are formed in approximately between about 0.25 to about 0.5 seconds. Further, the sonic horn 518 requires an input voltage of approximately between 207 to 253 Volts for ultrasonic power. Typically, the sonic horn 518 outputs approximately 36 kHz and approximately between 500 to 1200 Watts.

Figure 11B:
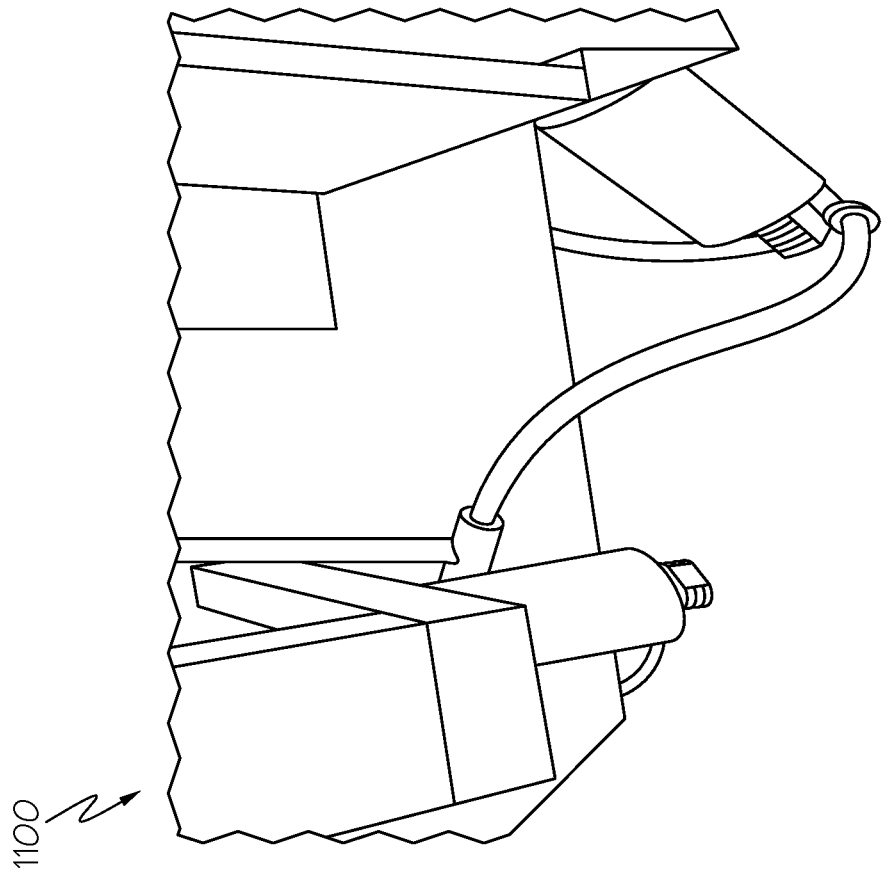
FIG. 11A and FIG. 11B illustrate a perspective view of the ultrasonic air cooling of the sonic label welding device in accordance with the disclosed architecture.
Figure 11A:
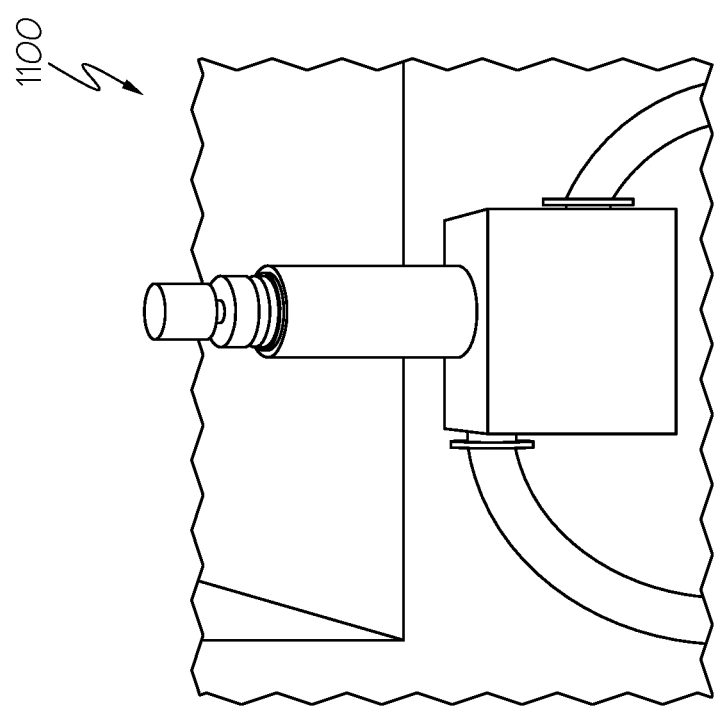

Specifically, as shown in FIGS. 10A and 10B, the ultrasonic units 1000 comprise a horn connection 1010, a pin connector 1020, a test switch 1030, and an amplitude adjustment 1040. The two ultrasonic units are located under the machine, such that when you open the doors, they are visible. The pin connector 1020 of the ultrasonic units 1000 communicates with the PLC and the horn connection 1010 sends energy to the horn when called for. The ultrasonic units 1000 are powered via a power cord which provides voltage to the units. The test switch 1030 may be used to determine if the horn is working, and the amplitude adjustment 1040 may be used to increase or decrease the frequency. As shown in FIGS. 11A-11B, the ultrasonic horns have to be cooled in order not to fail. A valve 1100 located in FIGS. 11A-11B supplies air to cool both of the horns. A user would open the valve 1100 for more air and close it for less.

Figure 12B:
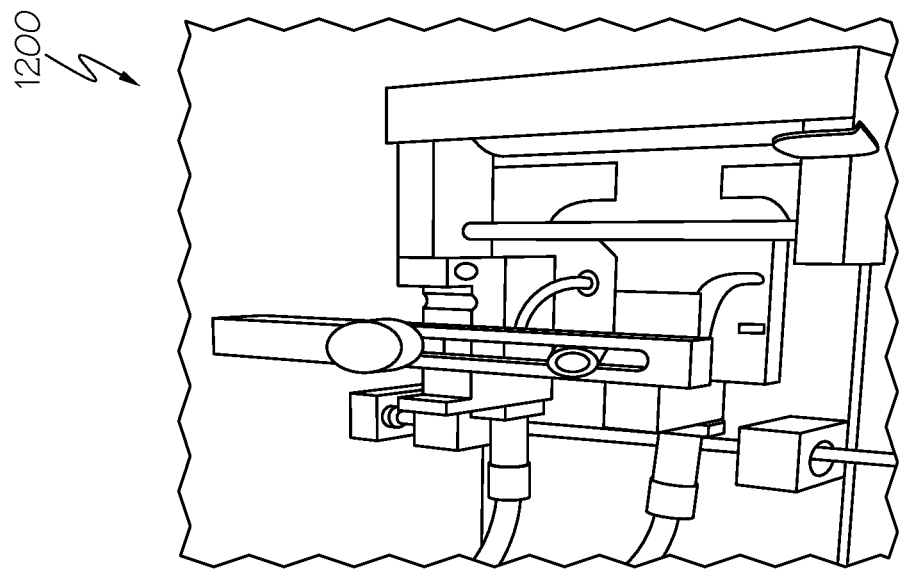
FIG. 12 illustrates a perspective view of the sensors of the sonic label welding device in accordance with the disclosed architecture.
Figure 12A:
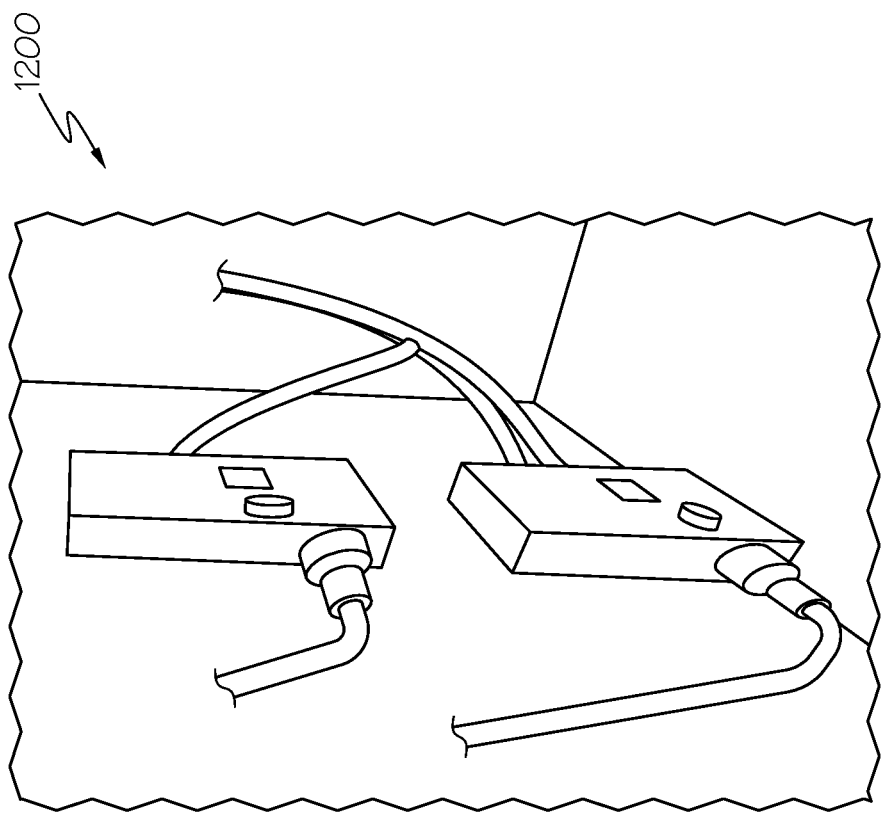
Figure 13:
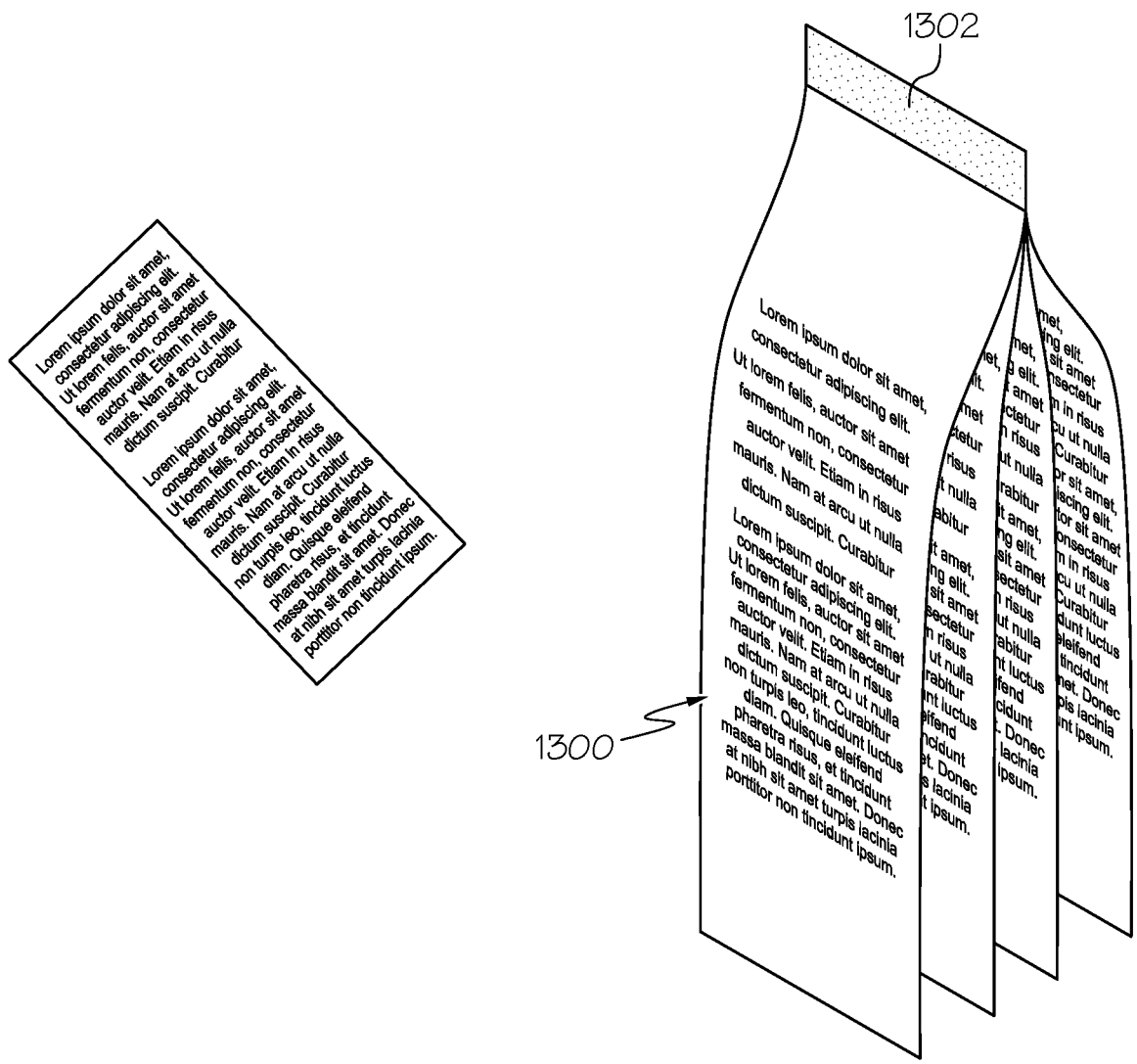
FIGS. 13-19 illustrate a perspective view of a stack of labels welded together via the sonic label welding device in accordance with the disclosed architecture.
Figure 14:
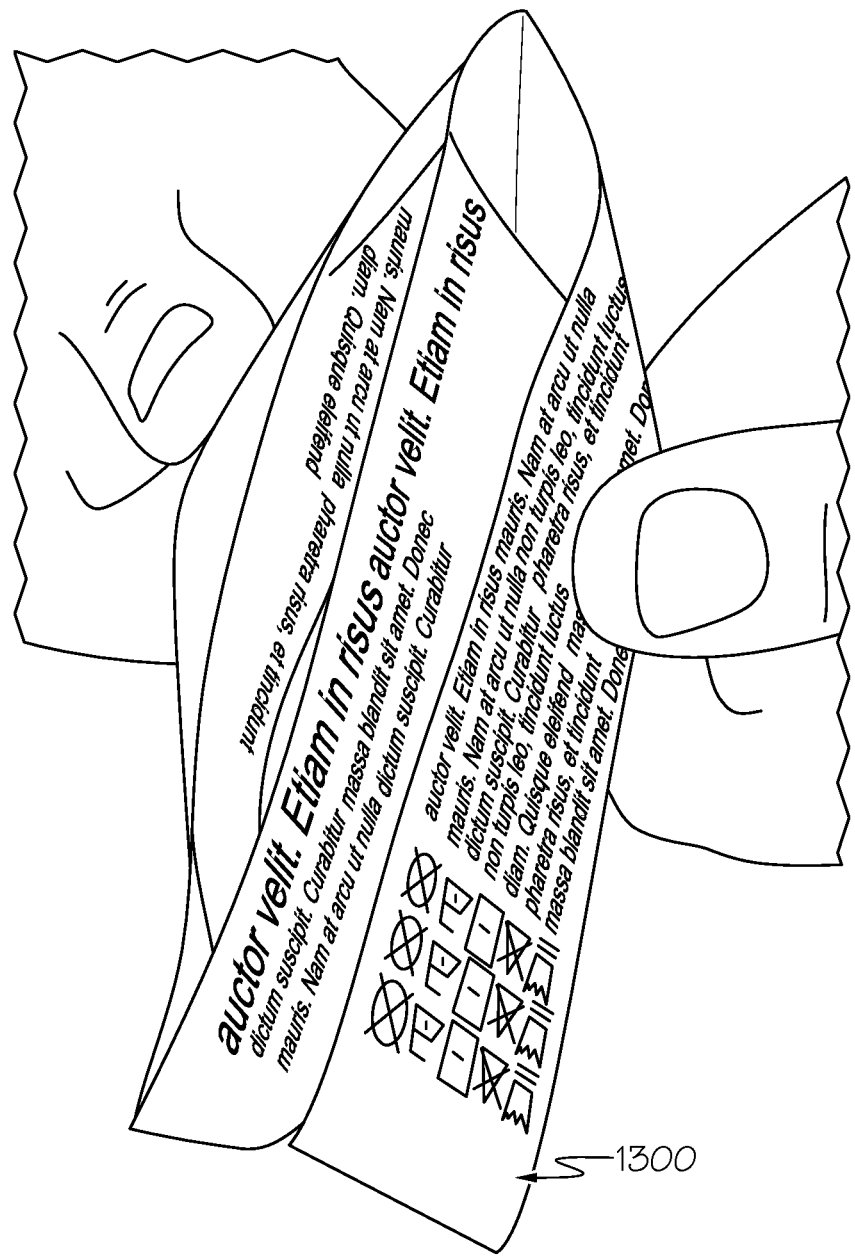
Figure 15:
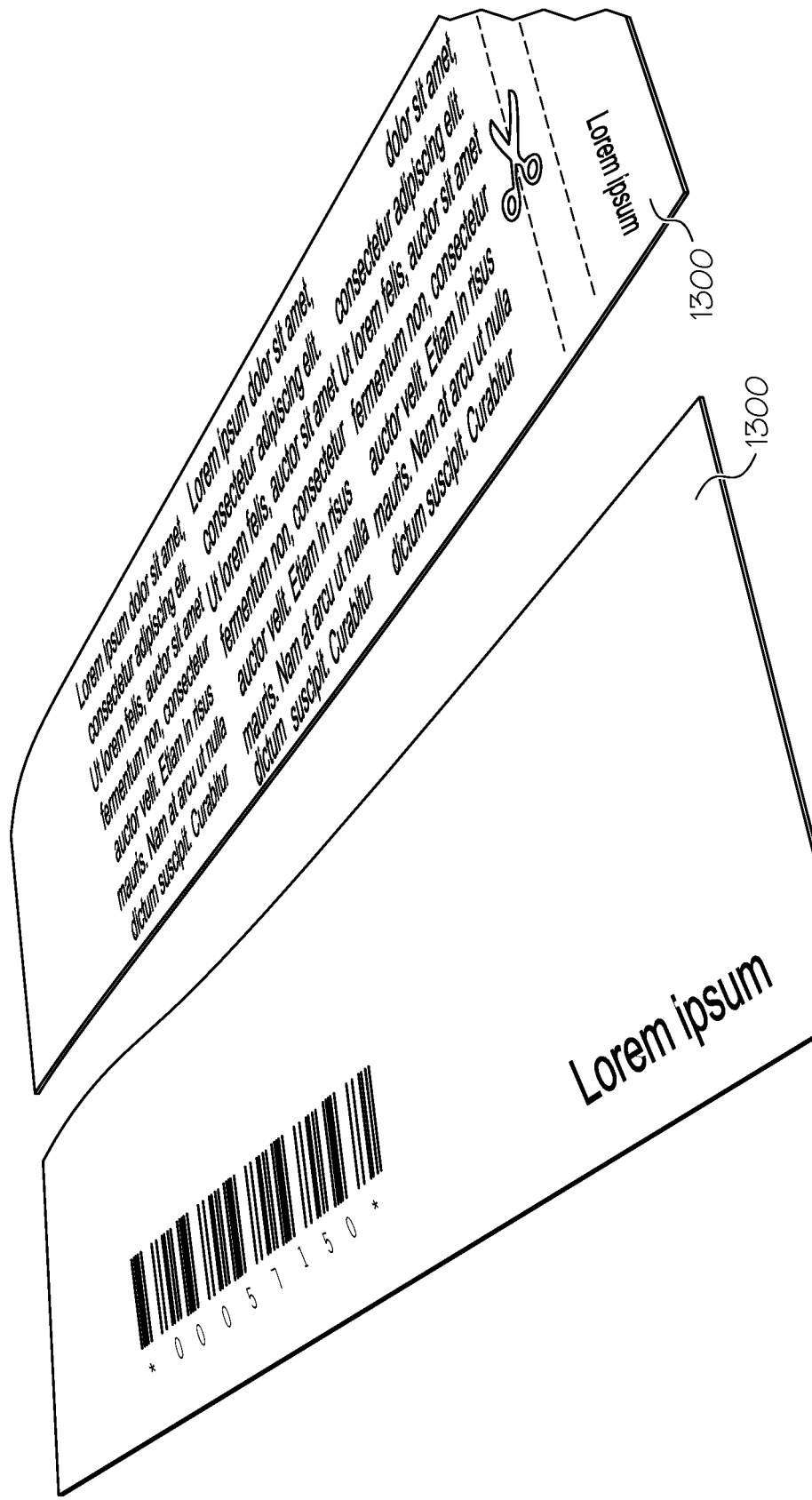
Figure 16:
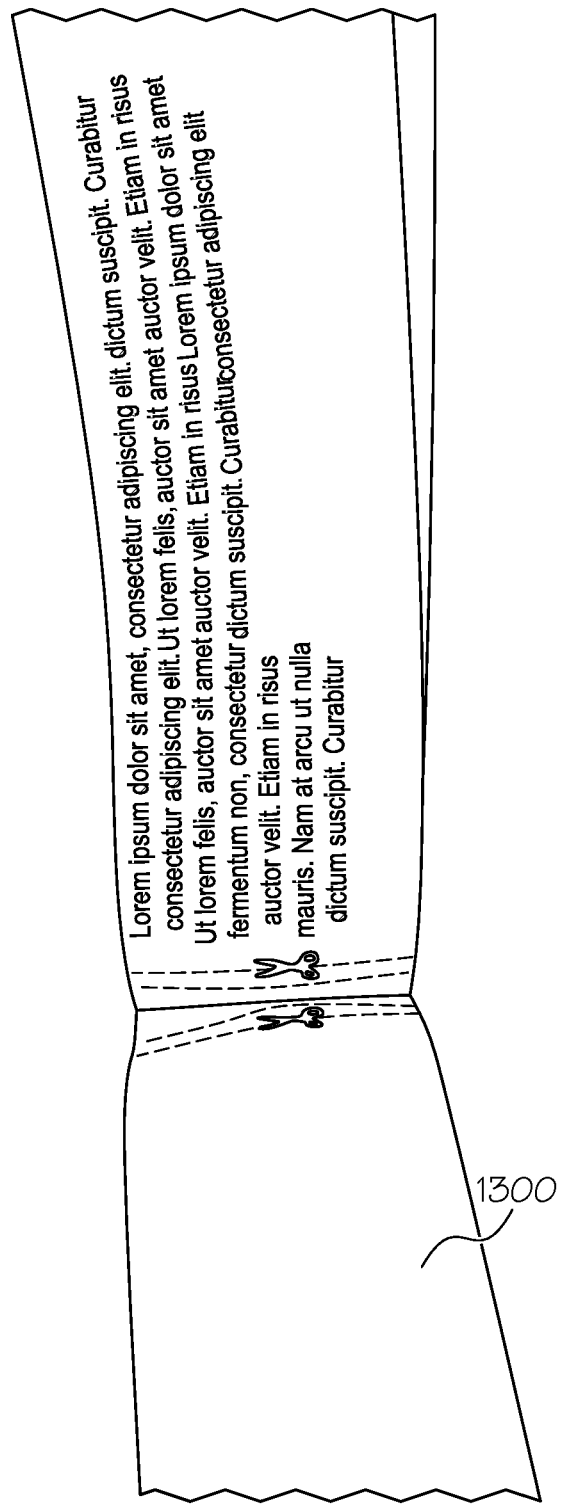
Figure 17:
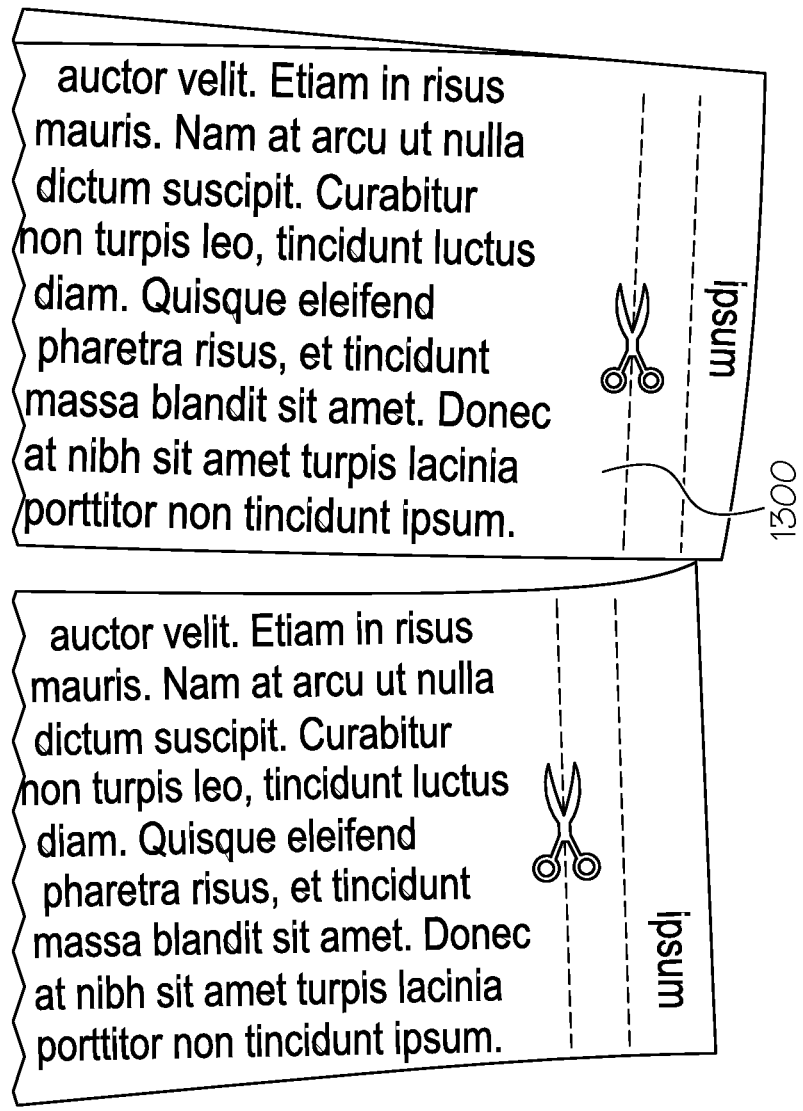
Figure 18:
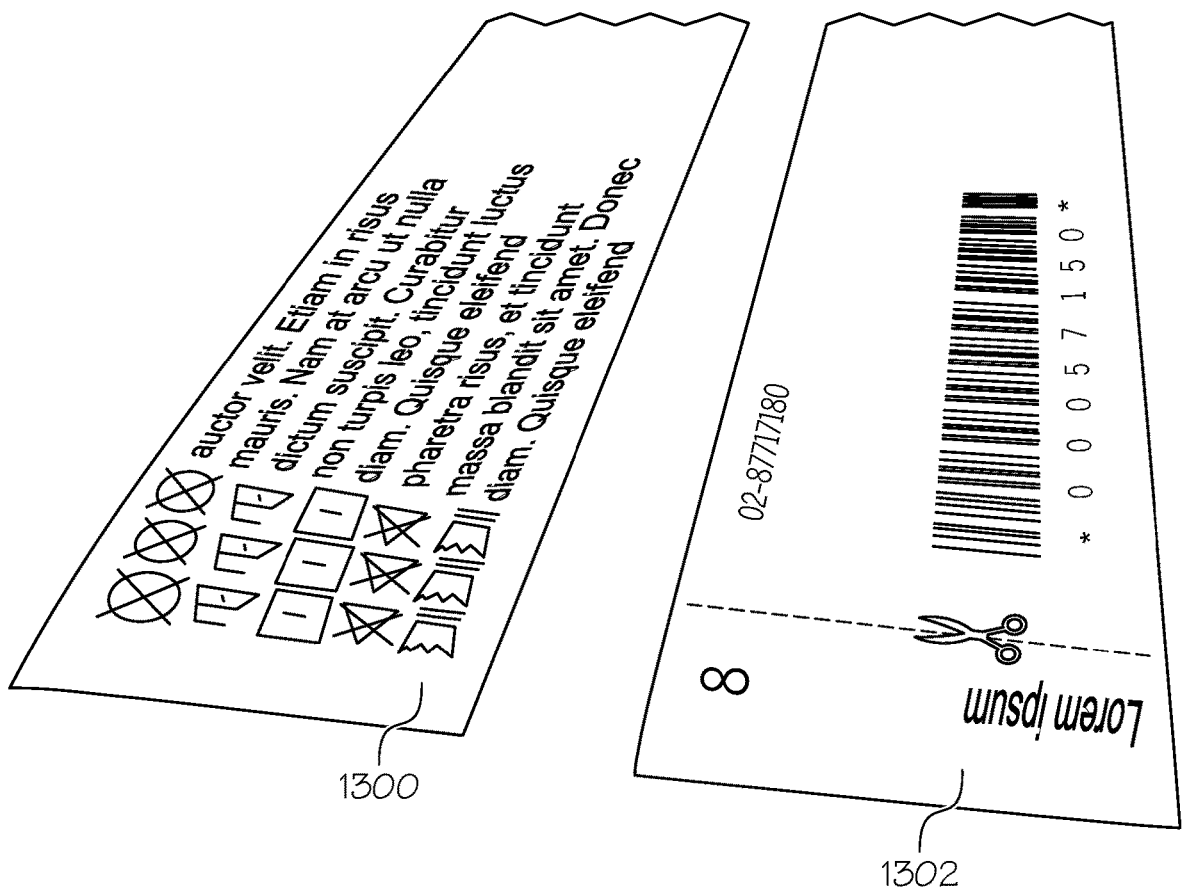
Figure 19:
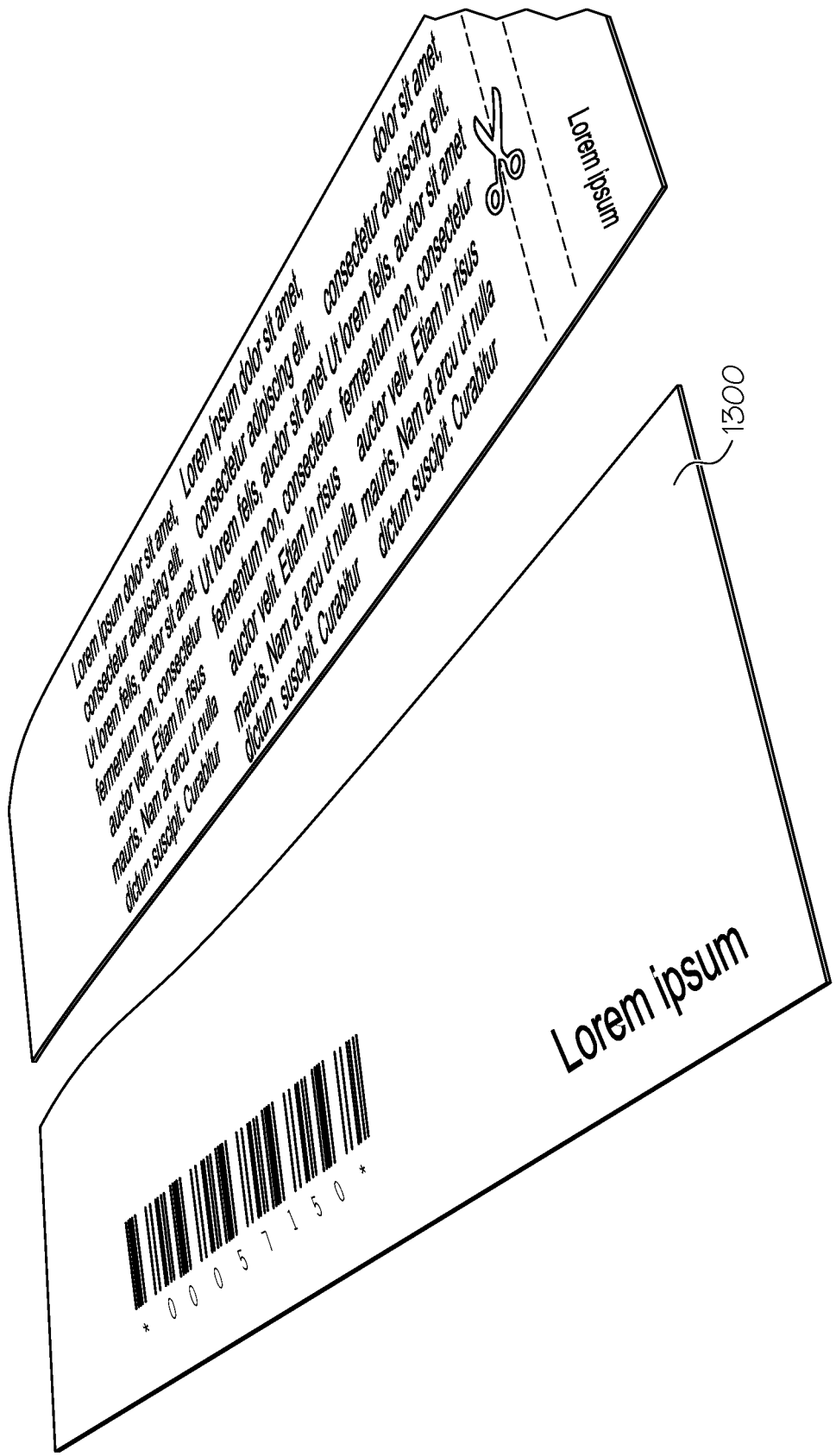

As shown in FIGS. 12A-12B, ultrasonic units 1000 further comprise sensors 1200. The two sensors 1200 detect both the material and the registration mark. The mark may be placed on the material to allow the machine to accurately cut the label to its desired length. Both sensors should be lit and should be looking at the edges of the material.

FIGS. 13-19 illustrate multiple labels 1300 welded together using the sonic welding device (shown in FIG. 5). The labels 1300 or other articles used with the sonic welding device are typically made of fabric (either woven or non-woven), thermoplastic material or a film-like material, such as acrylic, nylon, polyester, polyethylene terephthalate (PET), etc. which is essentially unreceptive to colored dyes. However, any other suitable material can be used as is known in the art for ultrasonic welding, without affecting the overall concept of the invention. Typically, the labels 1300 are utilized on a fabric garment, such as a shirt, shorts, pants, etc. However, the labels 1300 can be attached to substrates other than garments without affecting the overall concept of the invention. Further, both sides of the labels 1300 can bear indicia, either printed or woven. For example, when preparing a care label or other similar compliance label each of the label plies may be provided with identical information but each label ply in a different language, e.g. English, Spanish, French, German, etc. Indicia may not only include text but also graphic symbols such as symbols designating the type of washing to be performed.

Care labels 1300 can be of any size, but the typical dimensions of a care label are between 25-40 mm wide and 90-100 mm long. Care labels are typically constructed of a satin material, though other materials can also be used without affecting the overall concept of the present invention. Care labels 1300 typically include anywhere from two to six layers or panels, which are then sonically welded together to form a single multi-layer care label.

The weld 1302 produced by the sonic welding device adheres the labels 1300 together, and can be adjusted for strength such that the top or bottom layers can be peeled or torn off without significantly damaging the labels below or above the label being removed. Specifically, the labels 1300 are shown to be generally rectangular and to be separately releasably adhered together by the weld 1302. The connection of the labels 1300 via the weld 1302 is preferably strong enough to keep the labels adhered together during repeated washings or dry cleanings, yet the weld is weak enough so that either one or multiple labels 1300 can be manually pulled or stripped away from the stack without destroying the other labels of the stack, or the garment or product bearing the labels.

The weld 1302 produced by the sonic welding device is preferably made perpendicular to the web travel, but generally parallel to the print appearing on the label. Nonetheless, it is also contemplated that weld 1302 could be made perpendicular to the print without affecting the overall concept of the present invention. Welds 1302 preferably run edge to edge of the label material (i.e., the width of the label material), though it is also contemplated that sonic welding device could be set up to "tack" weld in preselected areas (e.g., a spot weld at each edge of the label material, each edge and the center of the label material, center only, etc.) to suit user preference.

The area of the multi-layered label containing the weld 1302 does not necessarily contain printed information therein, as this is typically where the label will be attached to the object or garment, but it may have printed information therein such as sewing instructions, brand information, security information, etc.

Now that the structure and configuration of the sonic label welding device has been generally described, its operation and set up will be discussed. Generally stated, the sonic weld process uses a combination of acoustic vibration and pressure to join the various labels together. The number of layers or labels being joined together will dictate the amount of pressure and weld time needed to successfully complete the sonic weld process. Generally stated, the more labels that are being joined, the more pressure and/or weld time that is needed. In contrast, if a user desires to maintain a welded packet of labels but leave open the possibility of later removing a particular layer or label, the user would use less pressure and/or less weld time. Additionally, tighter weaves or coated fabric labels will typically require more pressure and/or weld time than uncoated fabric labels.

Figure 20A:
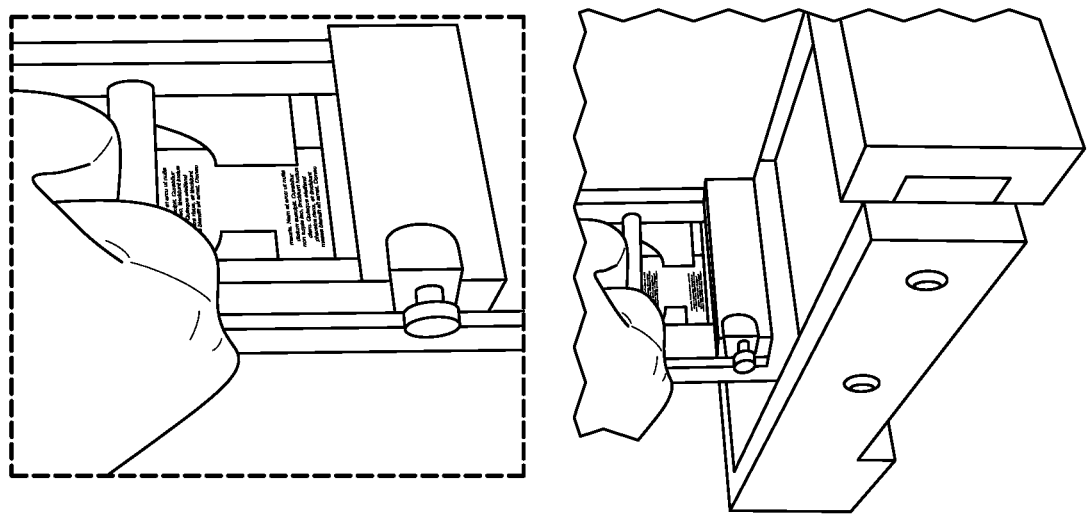
FIGS. 20-26 illustrate a perspective view of the set up operations of the sonic label welding device in accordance with the disclosed architecture.
Figure 20B:
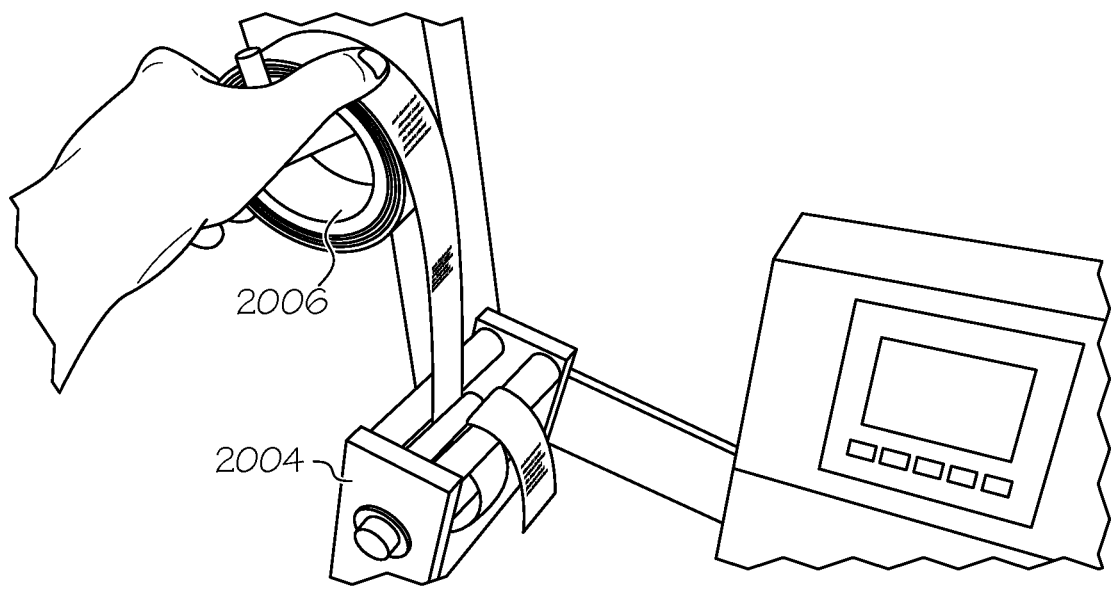
Figure 21A:
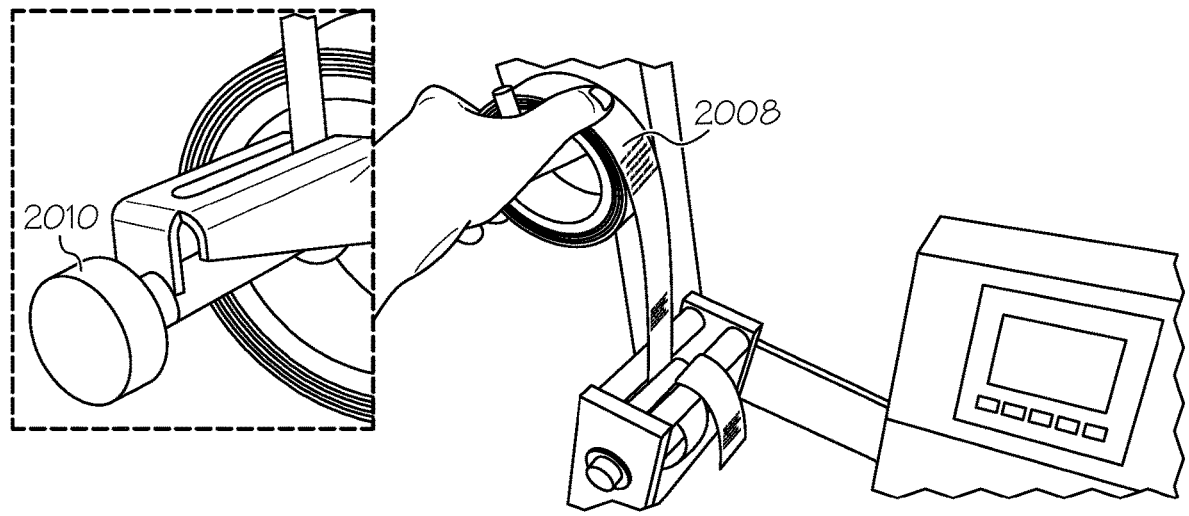
Figure 21B:
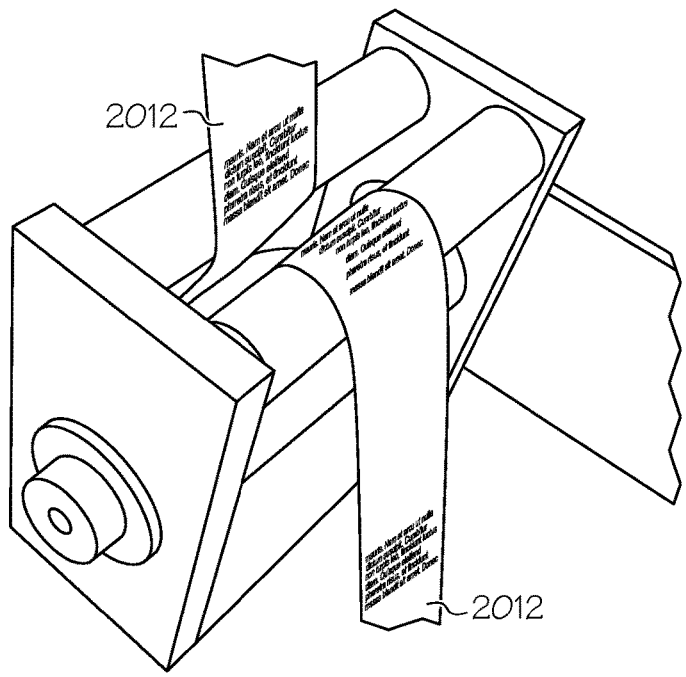
Figure 22A:
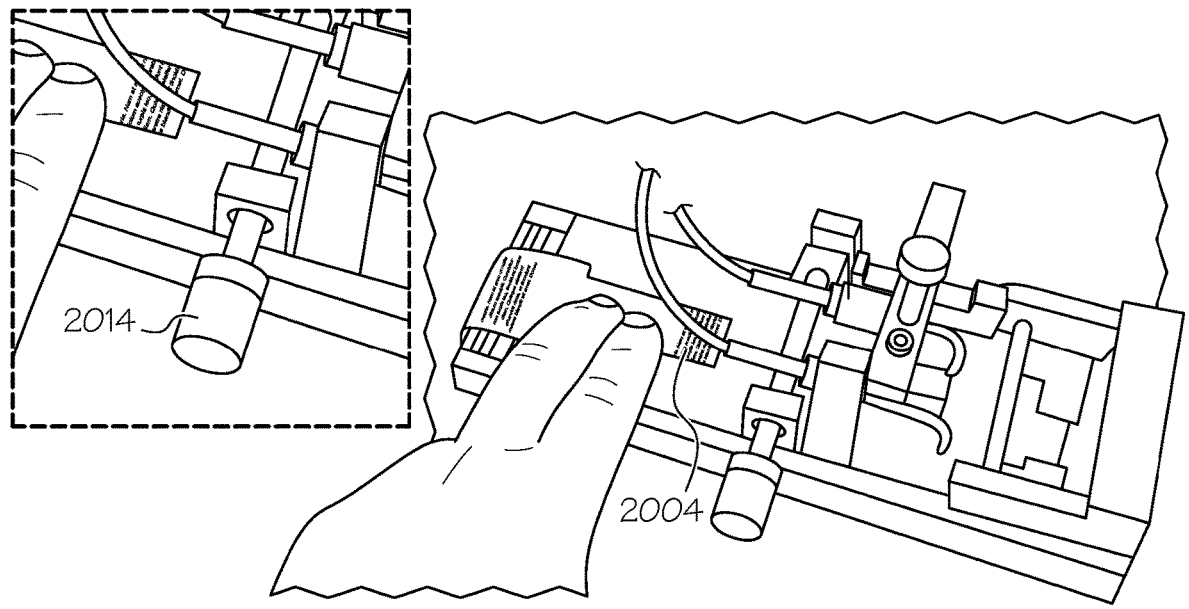
Figure 22B:
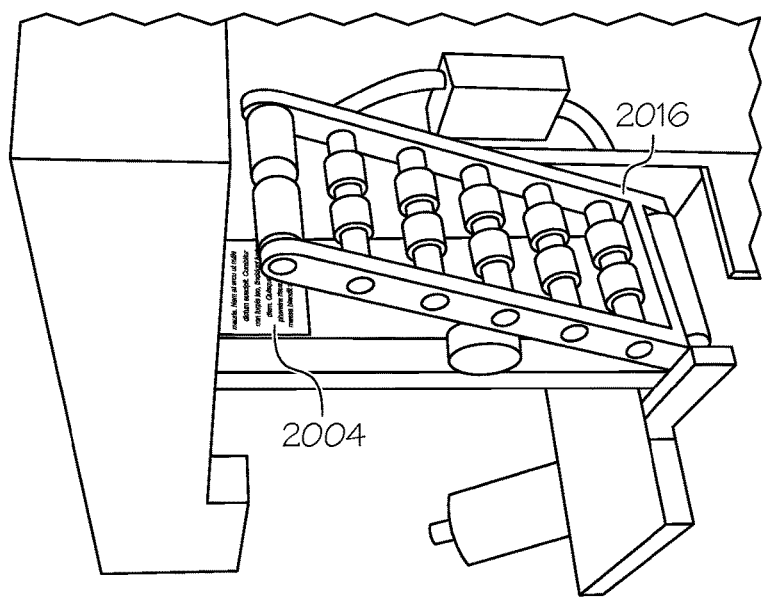

To operate one embodiment of the sonic label welding device of the present invention as shown in FIGS. 20A-20B, a user opens the nip roller clamp 2000 by lifting the arm 2002, and winds the material 2004 (fabric, whether coated or uncoated, synthetic or natural fibers) back up on the old roll 2006 and removes the old roll 2006 from the holder. As shown in FIGS. 21A-21B, the user places a new label roll 2008 on the holder and adjusts the side guide by turning the adjustment knob 2010, and threads through the unwind rollers 2012, as shown in FIGS. 21A-21B. As shown in FIGS. 22A-22B, the user threads material 2004 up to the side guides and adjusts width of the guides to the material width using the adjustment knob 2014 shown in FIGS. 22A-22B.

Figure 23A:
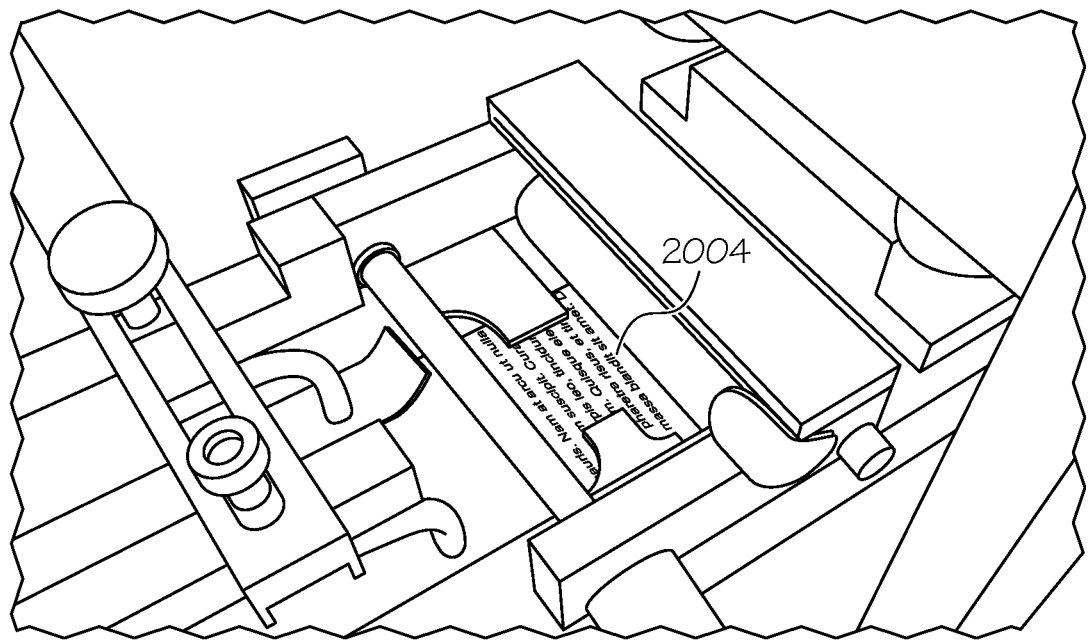
Figure 23B:
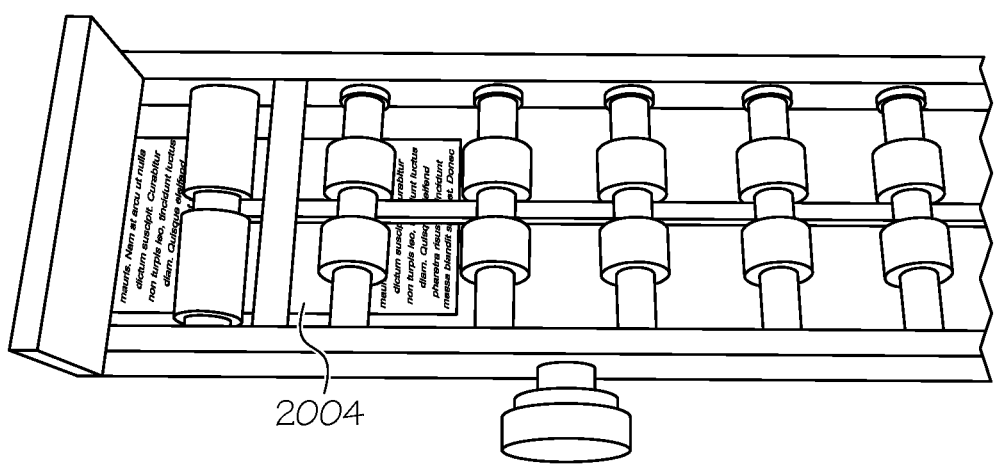
Figure 24A:
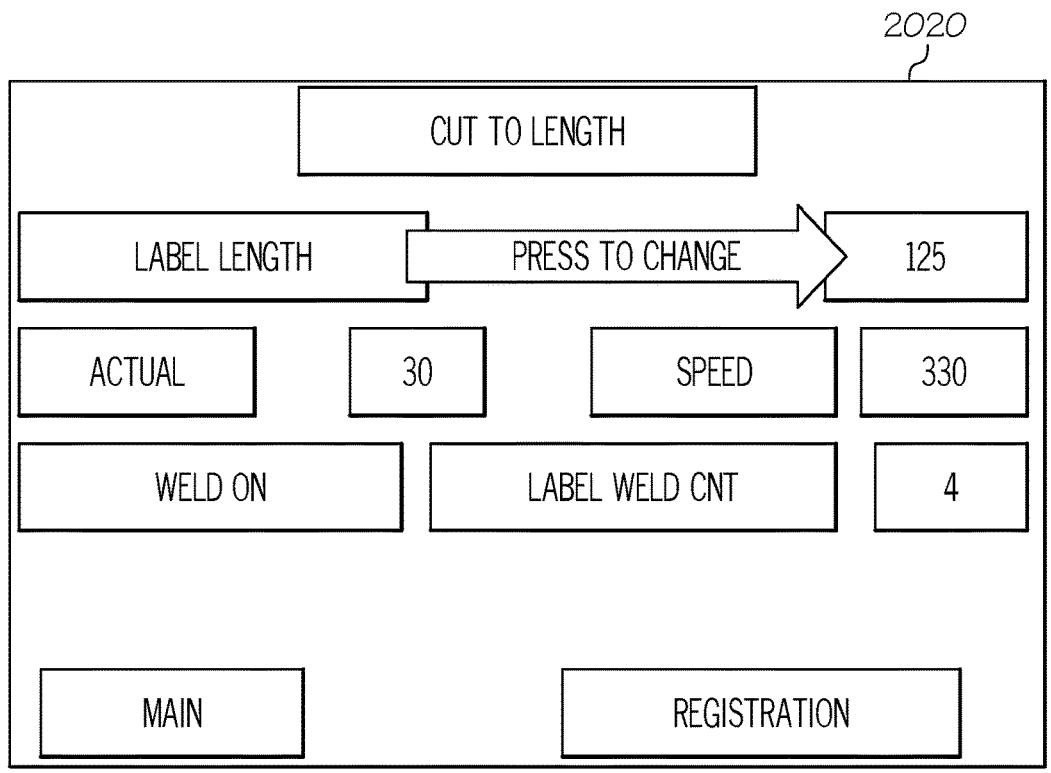
Figure 24B:
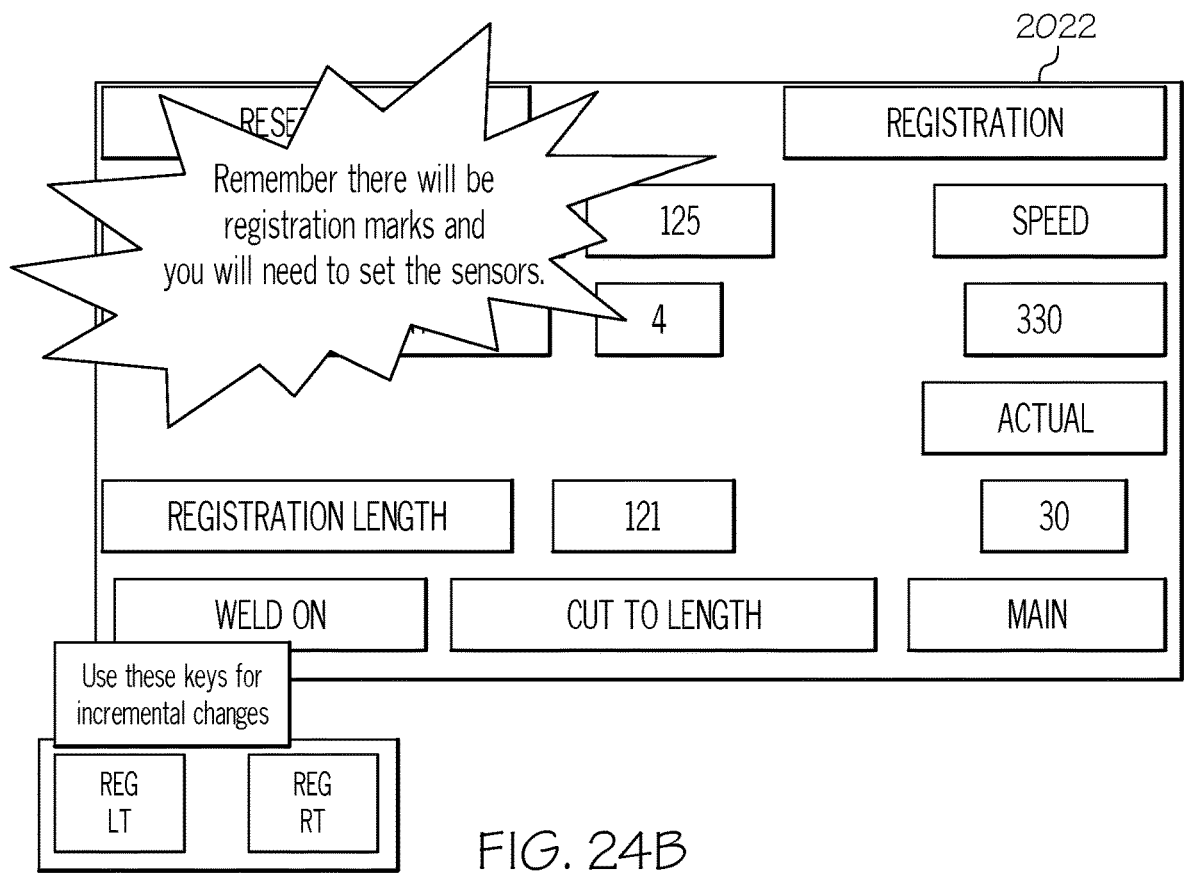

Then, the user lifts the roller gate 2016 and opens the out-feed rollers after the material passes the knife and moves into the out-feed section. As shown in FIGS. 23A-23B, the user then closes the nip roller by pushing down on the lever and closes upper gate rollers 2018 until they touch the material 2004. As shown in FIGS. 24A-24B, the user sets a length in the panel if using length only on the cutting, and also sets a stack count. The user uses the screen shown in FIGS. 24A-24B to cut the material 2004 to length, and sets the length by pressing the button 2020 and entering the number desired. If using registration marks, the user sets the panel to registration. The user uses the registration screen shown in FIGS. 24A-24B for registration marks, and sets the registration length by pressing the button 2022 and entering the value desired, and uses keys for incremental changes.

Figure 25:
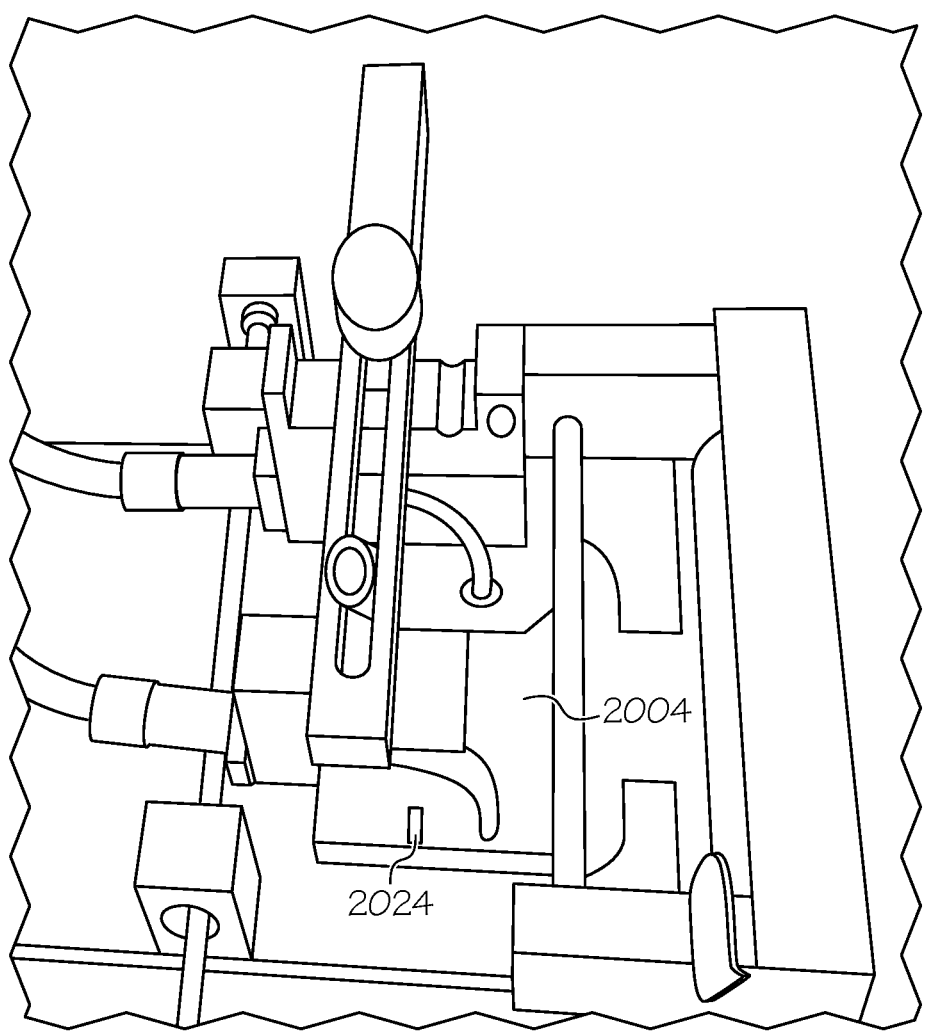
Figure 26A:
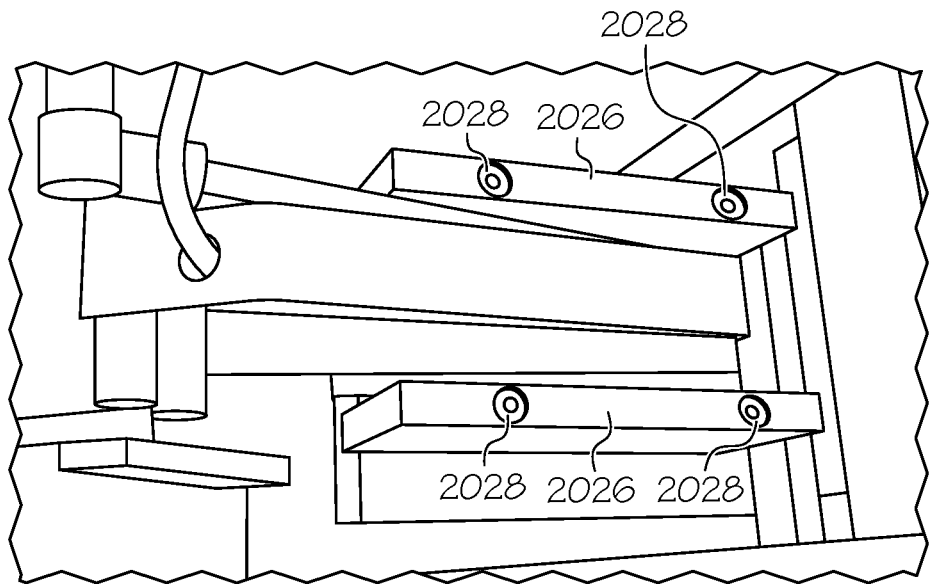
Figure 26B:
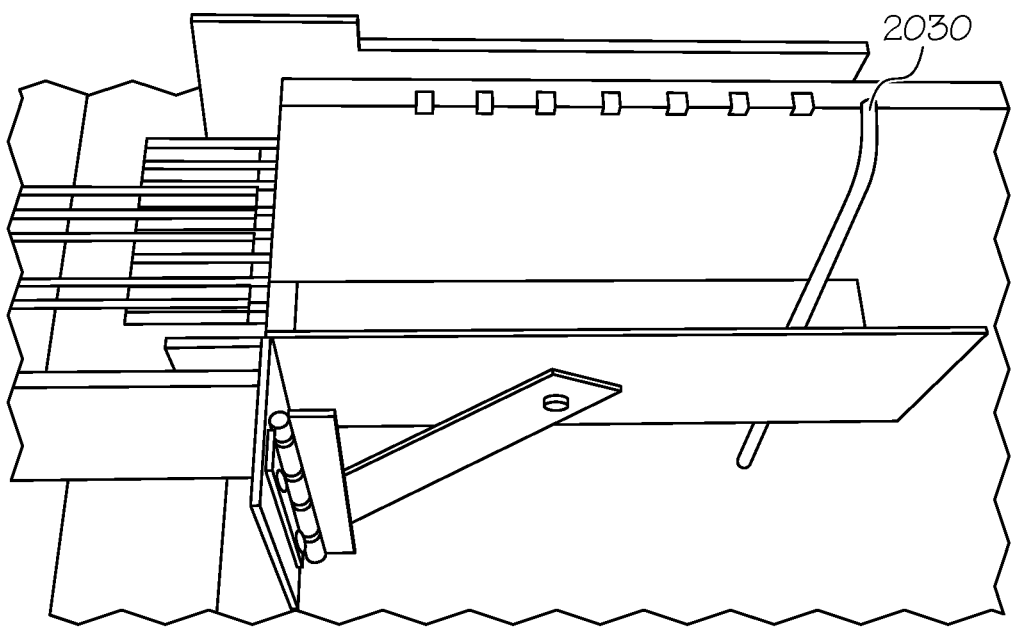

As shown in FIG. 25, the user sets the registration sensor if using registration marks 2024, and sets the registration sensor to detect the registration mark 2024 on each side of the material 2004. As shown in FIGS. 26A-26B, the user adjusts the welding hopper guide 2026 to the width of material 2004, by loosening the four locking bolts 2028, setting the width and then tightening the bolts 2028. Finally, the user adjusts the exit hopper to the label width. The user sets the exit hopper by loosening the bolts shown and adjusting the width. Also, the user moves the back stop 2030 by placing it in a different hole. Then, the user starts device, tests the same and adjusts as necessary. Specifically, the user would start the device, recheck set up, verify the material has correct dimensions, ensure cut is clean, ensure weld is good, adjust device speed to run consistently, and then run material. To run the material, a web is fed into the cutter (i.e., a hot/sonic knife or a cold knife depending on the materials type as described more fully supra), the labels are cut, collected and assembled into a care label intermediate (i.e., a stack of pre-welded labels), sonically welded, collected and affixed to an object such as a garment. In a preferred embodiment of the present invention, the care label is attached to a garment using plastic staples, such as Swiftach® plastic staples manufactured and sold by Avery Dennison Corporation.

The web of labels can be preprinted or a printer can be installed inline just prior to the step of cutting the web into individual label panels. In a preferred embodiment of the present invention, the printer is a SNAP® thermal printer manufactured and sold by Avery Dennison Corporation. An RFID inlay can also be added to the labels prior to the sonic welding of the same, or affixed to the label packet after welding.

If during its operation the sonic label welding unit is experiencing cutting and/or welding issues, the user can run various trouble shooting options. For example, if the ultrasonics of the unit are not functioning, the user may elect to test the generator. If more frequency or more air pressure is needed, the user should consider adjusting the knife depth and/or changing the knife. If the sonic label welding unit is not feeding properly, the user should check (i) to see if the web material is threaded incorrectly, (ii) if the nip roller is not down, (iii) if the nip roller needs replacement, and/or (iv) if the exit rollers are not pressing against the web material. If the sonic label welding unit jams, the user should check to see if both the welding hopper and the exit hopper are set correctly, and/or check to see if there is too much static or curl in the web material.

Figure 27:
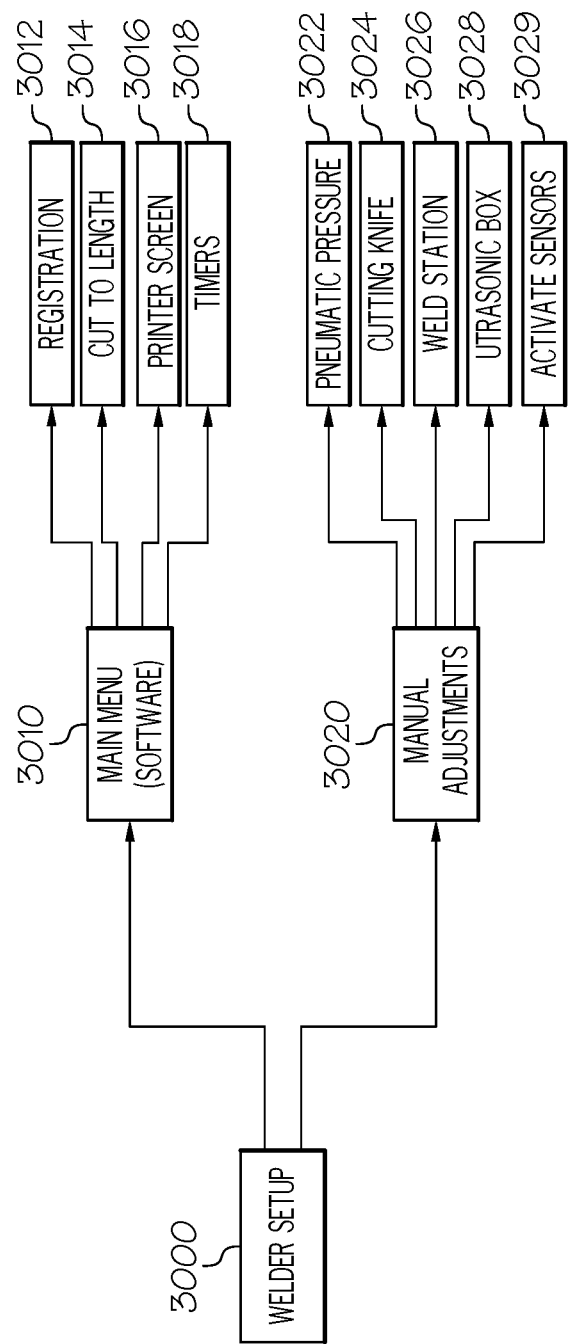
FIG. 27 illustrates the set-up process of the sonic label welding device in accordance with the disclosed architecture.

FIG. 27 illustrates the set-up process of the sonic label welding device in accordance with the disclosed architecture. More specifically, at step 3000, the user enters the welder setup and can elect to proceed to either the main menu 3010 or to make manual adjustments 3020. If the user elects to proceed to the main menu 3010, the user can then proceed to enter the desired settings or adjustments to one or more of the following: (i) registration 3012; (ii) cut to length 3014; (iii) printer screen 3016; and/or (iv) timers 3018, each of which is described more fully supra.

Conversely, if the user elects to proceed to manual adjustments 3020, the user can then manually adjust one or more of the following: (i) pneumatic pressure 3022; (ii) cutting knife 3024; (iii) weld station 3026; (iv) ultrasonic box 3028; and/or (v) activate sensors 3029.

The present invention contemplates that in one embodiment, variable data made be included within the weld. For instance the variable data may include the source of consumable goods such as labels or the final destination or customer of the consumable goods. The variable data may also include, but is not limited to, a factory code of a specific vendor. This embodiment may be achieved by creating a chase or plate that has at least one patterned surface in which the RF horn presses against the chase or plate.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sonic label welding device for welding multiple labels together using ultrasonic welding, comprising:
    a digital controls main menu screen comprising touch screen buttons that are utilized to go to specific screens and the touch screen buttons include one or more of the following: a registration button, a cut to length button, a printer screen button, and a timer button;
    an anvil;
    a head;
    a converter;
    a sonic horn; and
    a power supply; and
    wherein the power supply delivers an electrical signal, the converter converts the electrical signal into a mechanical vibration, and the sonic horn applies the high frequency, mechanical vibration to the multiple labels to be welded together.

2. The sonic label welding device of claim 1, wherein the main menu screen further comprises one or more of the following: a start cycle button, a stop cycle button, a move registration number button, and an escape button.

3. The sonic label welding device of claim 1, wherein the head is comprised of a knurled surface.

4. The sonic label welding device of claim 1, wherein the device further comprises an air cylinder and a solenoid valve for controlling the air cylinder.

5. The sonic label welding device of claim 1, wherein the strength of the welding is such that a top label or a bottom label can be torn off of the multiple labels welded together without destroying a remaining set of labels in said multiple labels welded together.

6. A sonic label welding device for welding multiple labels together using ultrasonic welding, comprising:
    a digital controls main menu screen comprising touch screen buttons that are utilized to go to specific screens;

an anvil;
a head;
a converter;
a sonic horn;
at least one patterned plate that comprises variable data;
a power supply;
a knife; and
the power supply delivers an electrical signal, the converter converts the electrical signal into a mechanical vibration, and the sonic horn applies the high frequency, mechanical vibration to the multiple labels to be welded together.

7. The sonic label welding device of claim 1, further comprising a knife.

8. The sonic label welding device of claim 1, wherein one of the screens is a registration screen.

9. The sonic label welding device of claim 8, wherein the registration screen has multiple controls for using a registration mark on a product.

10. The sonic label welding device of claim 1, further comprising a welding station with a welding cylinder, a welding bar, a hopper, a gate and a gate cylinder.

11. The sonic label welding device of claim 1, wherein the sonic horn requires an input voltage of between 207 to 253 volts.

12. The sonic label welding device of claim 1, wherein the sonic horn outputs 36 kHz and approximately between 500 to 1200 Watts.

13. The sonic label welding device of claim 6, wherein the knife is a cutting knife.

14. The sonic label welding device of claim 6, wherein the knife is a cold knife.

15. The sonic label welding device of claim 6, further comprising an outfeed conveyor and hopper.

16. The sonic label welding device of claim 6, further comprising at least one sensor.

* * * * *